United States Patent [19]

Neuberger

[11] 4,158,885

[45] Jun. 19, 1979

[54] GUIDANCE-LIGHT DISPLAY APPARATUS AND METHOD FOR IN-FLIGHT LINK-UP OF TWO AIRCRAFT

[75] Inventor: Wayne K. Neuberger, Renton, Wash.

[73] Assignee: The Boeing Company, Seattle, Wash.

[21] Appl. No.: 849,940

[22] Filed: Nov. 9, 1977

[51] Int. Cl.² .................. G06F 15/50; G01B 11/27; G01C 3/06

[52] U.S. Cl. ............................ 364/460; 244/135 A; 340/27 AT; 356/5; 356/152; 364/565

[58] Field of Search ........ 244/135 A; 340/25, 27 NA, 340/27 AT, 27 SS; 343/12, 112 S, 112 CA; 35/12 N; 356/5, 152; 364/460, 461, 565

[56] References Cited

U.S. PATENT DOCUMENTS

| | | | |
|---|---|---|---|
| 2,968,023 | 1/1961 | Ferguson et al. | 340/26 |
| 2,975,400 | 3/1961 | Ferguson et al. | 340/26 |
| 2,993,997 | 7/1961 | McFarlane | 244/135 A |
| 3,158,834 | 11/1964 | Evans | 340/26 |
| 3,285,544 | 11/1966 | Chope et al. | 244/135 A |
| 3,662,332 | 9/1972 | Zechnowitz et al. | 340/26 |
| 3,691,520 | 9/1971 | Nordström | 340/27 AT |
| 3,729,262 | 4/1973 | Snead et al. | 340/26 |
| 3,775,741 | 11/1973 | Zechnowitz et al. | 340/26 |
| 3,790,938 | 2/1974 | Anderson et al. | 343/112 CA |
| 3,843,263 | 10/1974 | Snead | 340/26 |
| 3,885,226 | 5/1975 | Lang et al. | 340/25 |
| 3,900,261 | 8/1975 | Wingate | 356/5 |
| 4,025,193 | 5/1977 | Pond et al. | 244/135 A |
| 4,041,285 | 8/1977 | Shidel et al. | 364/460 |

FOREIGN PATENT DOCUMENTS 793868  4/1958  United Kingdom .............. 340/27 AT

OTHER PUBLICATIONS

Sherman; Airborne Pinball Machine Guides Refueling, Popular Mechanics, Nov. 1960, pp. 150, 151.

Primary Examiner—Felix D. Gruber
Attorney, Agent, or Firm—Christensen, O'Connor, Johnson & Kindness

[57] ABSTRACT

A display panel of selectively operated pilot guiding lights is mounted on the belly of a fuel tanker aircraft for guiding a piloted receiver aircraft into proper orientation for an in-flight refueling link-up in which a fuel dispensing boom that projects rearwardly and downwardly from the belly of the tanker aircraft is coupled to a complimentary, refueling receptacle mounted above the cockpit of the receiver aircraft. The guidance-lights are selectively and automatically operated by computer processed position signals developed by an optical position sensor system that continuously monitors the position of the receiver aircraft relative to the boom. A first set of guidance-lights are disposed lengthwise of the aircraft to form a fore-aft position indicating array, and a second set of lights are disposed in a cross-shaped array for providing a coordinated visual display of elevational and azimuthal position. In addition to these position indicating lights, the fore-aft array includes a series of longitudinally spaced lights which are sequentially strobed toward the nose or tail of the tanker aircraft to respectively indicate that the receiver aircraft is either closing on or falling behind the target refueling position and the frequency of such strobing is varied to indicate to the receiver pilot the rate at which he is closing on or falling behind such target position.

11 Claims, 12 Drawing Figures

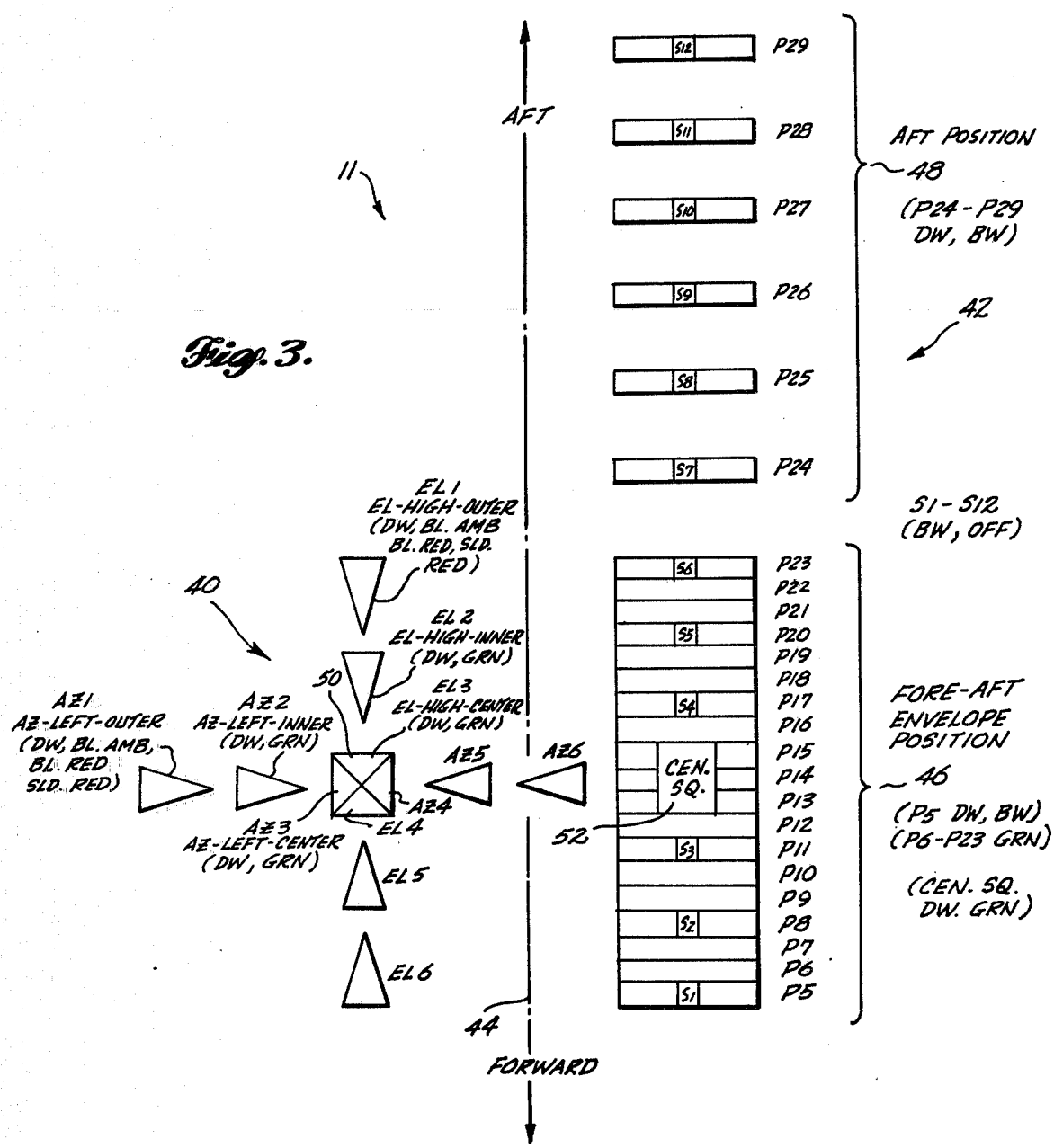
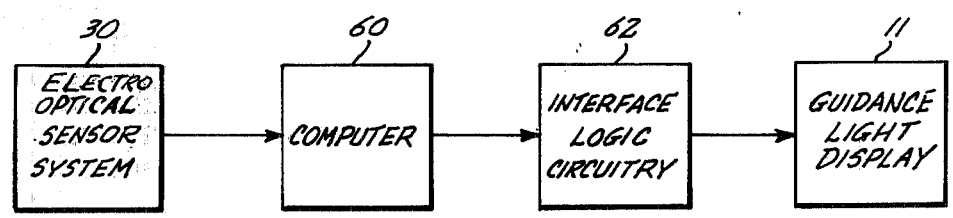
Fig. 3.

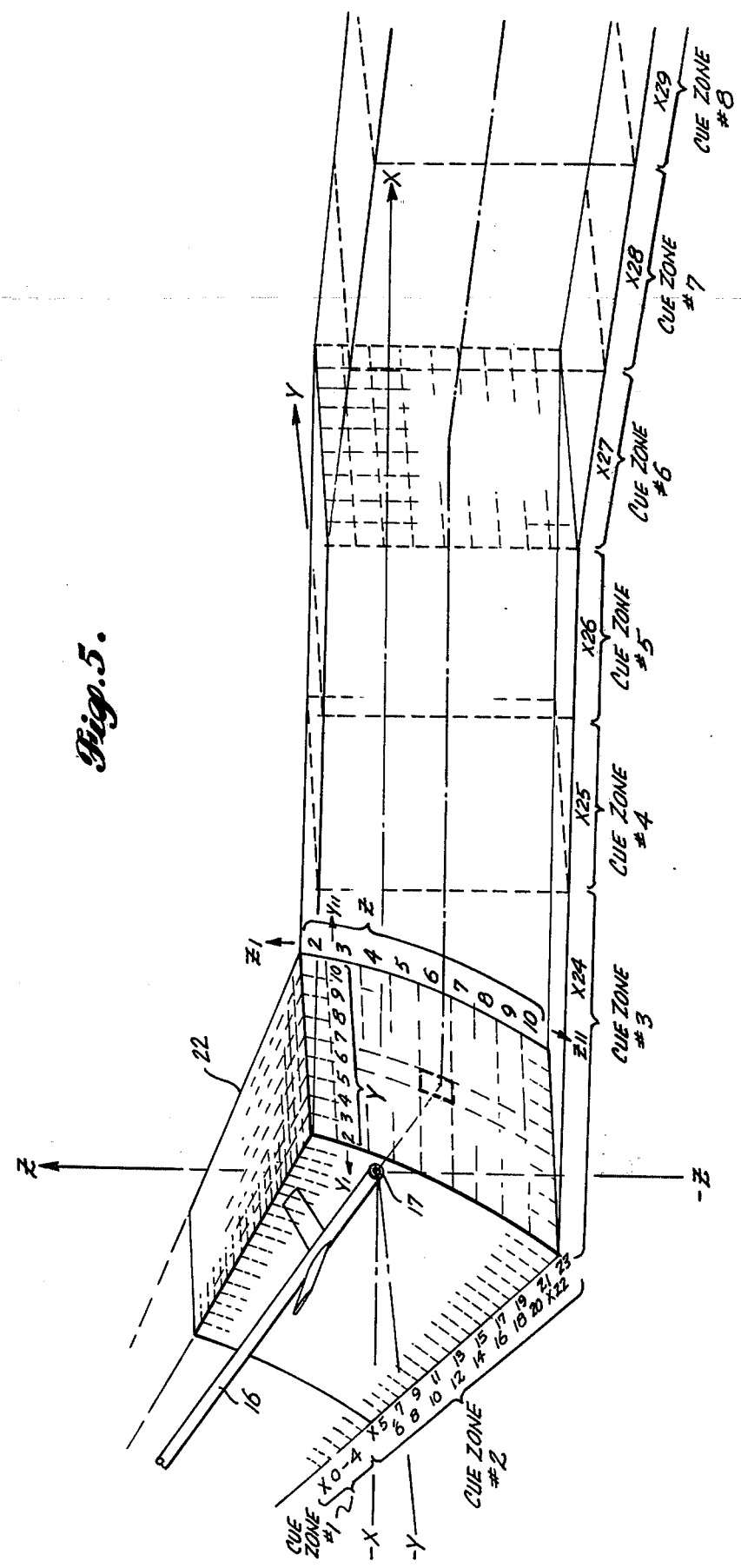

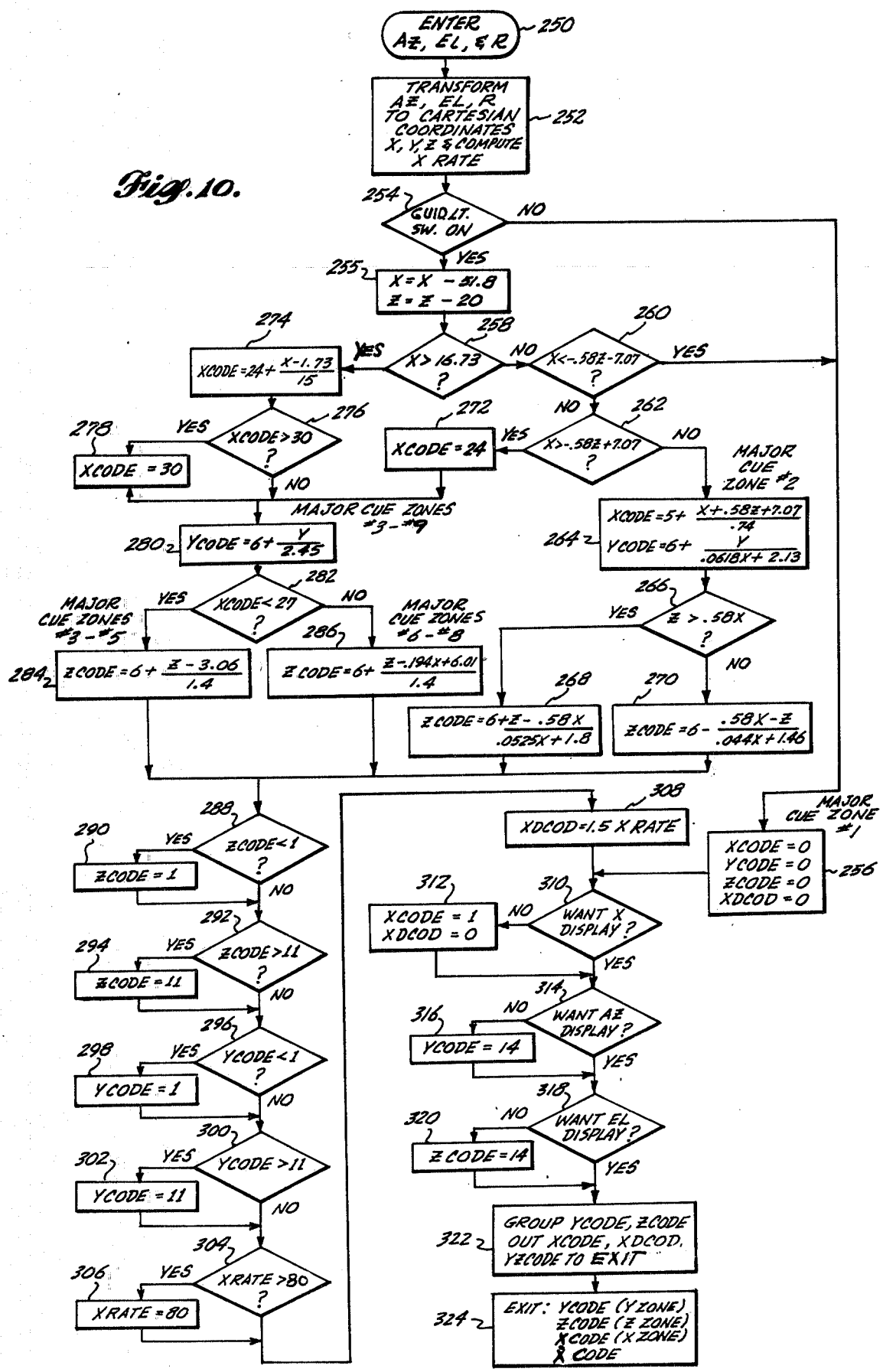

GUIDANCE-LIGHT DISPLAY APPARATUS AND METHOD FOR IN-FLIGHT LINK-UP OF TWO AIRCRAFT

BACKGROUND OF THE INVENTION

In general the invention pertains to systems for orienting one aircraft with respect to another while in-flight a mechanical link-up between the aircraft such as for aerial refueling operations or the like, and more particularly to a guidance light display suitable for being mounted on the exterior of one of the aircraft for guiding the pilot of the other aircraft into the desired link-up position.

In certain aerial refueling operations, the tanker aircraft is piloted in a level flight path and the receiver aircraft is guided into a link-up position with a refueling boom that extends downwardly and rearwardly from the aft belly section of the tanker aircraft. The boom is swivelably mounted to the tanker aircraft and is telescopically extendable so as to accommodate relative movement between the two aircraft, so long as the receiver aircraft, and more particularly the fuel receptacle thereon, remains within a predetermined refueling evelope centered about an optimum link-up point located at a predetermined distance below the tail of the tanker aircraft. If the receiver pilot is unable to maintain his aircraft within the refueling envelope, then sensors associated with the boom on the tanker aircraft detect that the boom is over or under extended, or has drifted too far to the right or left, or up or down, and automatically causes a decoupling of the boom from the receiver aircraft.

It is evident that the receiver pilot has a difficult task in not only flying his aircraft into the limited region defined by the refueling envelope, but also in maintaining the refueling receptable on his aircraft within the evelope throughout the refueling operation. If, because of a piloting error, or because of adverse air conditions, the automatic decoupling feature causes the boom to become disconnected from the receiver aircraft, then it is necessary for the receiver pilot to repeat the tedious task of recapturing the boom.

Because of the noted difficulty of the operation, guidance systems have been previously proposed for assisting the receiver pilot in the necessary maneuvering of his aircraft. For example, one currently used guidance system provides a guidance-light display mounted on the belly of the tanker aircraft and within the field of view of the receiver pilot in which the lights in the display are selectively operated to direct the receiver pilot to move fore or aft, and up or down, relative to the tanker aircraft. While the guidance afforded by this currently used light display is helpful, it is not totally effective in assisting the pilot under certain operating conditions. For one, the guidance lights are primarily used only after a link-up has been effected, and after link-up the lights are automatically responsive to the various movements of the boom as it conforms to the relative positions of the tanker and receiver aircraft. For example, over-extension of the telescopic boom will automatically cause the guidance-lights to direct the receiver pilot to speed up and thus move forward relative to the tanker aircraft.

While the guidance-lights can also be used prior to link-up for guiding the receiver pilot into the refueling envelope, the lights in such case must be operated manually by a boom operator stationed in the tail section of the tanker aircraft and the manipulation of the lights in this case is subject to observational misjudgements as to the position of the receiver aircraft and slowness in responding to abrupt changes in position. Furthermore, even when the guidance-lights are automatically operated in response to the boom position, after link-up, the guidance-light information is limited to fore-aft position and up-down position. The receiver pilot is responsible for determining his right-left position (azimuth plane) based on his ability to see the outline of the fuselage and tail section of the tanker aircraft. Moreover, no display is provided of the relative velocity between the receiver and the tanker such that it is difficult for the receiver pilot to perceive how fast he is closing on or falling behind the refueling envelope.

These limitations become even more acute when the refueling operation must be performed at night or under limited visbility conditions. In such case, the receiver pilot does not have the benefit of being able to observe the outline of the tanker aircraft, and must rely solely on the effectiveness of the guidance-light display. Because of the limitations of the existing display, refueling during the night, or during other low-visibility conditions, is extremely difficult and hazardous. For tactical reasons, night refueling is sometimes mandatory in order to carry out the refueling operation without enemy observation and thus without consequent enemy interception. For these reasons it would be desirable to provide a guidance-light display system that provided sufficient pilot guidance information for making the refueling operation less hazardous under these special circumstances.

Even when visibility is near perfect, the receiver aircraft pilot has a difficult task in maintaining the receiver receptacle within the refueling envelope for the duration of the refueling operation. It is not unusual to incur one or more automatic disconnects during any refueling operation merely because of the inability of the receiver pilot to maintain the intense concentration and quick response needed to track the tanker aircraft and stay within the refueling envelope. Turbulence and other adverse air conditions can cause rapid shifting of the relative positions of the two aircraft and unless the receiver pilot is capable of correcting for such relative movement, the receiver receptacle may drift outside of the refueling envelope and thereby cause automatic decoupling between the boom and receptacle. To complete the refueling operation, it is necessary for the receiver pilot to repeat the approach sequence necessary for entering the envelope and recapturing the boom. As a result, excessive delays may be incurred in completing the refueling and the receiver pilot may be subjected to undue stress by being forced to repeat the delicate and risky link-up procedure.

In other proposed systems for guiding a receiver pilot into refueling position, instrumentation is mounted within the cockpit of the receiver aircraft for displaying such information as fore-aft, up-down and right-left position in response to optical or radiation sensing equipment that automatically monitors the relative positions of the two aircraft. The displayed information may be in the form of meter readings, or position-indicating blips or dots on the face of a cathode ray tube. While systems of this type provide a greater amount of pilot guidance information, the manner in which it is displayed is less than optimum for the unique conditions of aerial refueling operations. In particular, any meter or cathode ray tube display within the receiver pilot's cockpit, requires the pilot to look back and forth between the tanker aircraft and the instrumentation panel within the cockpit. When the pilot momentarily looks away from the tanker aircraft, to get a fix on the cockpit instrumentation, he increases the risk of accidentally overrunning and colliding with the tanker aircraft or with the refueling boom carried thereby. Furthermore, there is a greater cost involved in equipping all the receiver aircraft in a fleet with refueling guidance systems, as compared to equipping a single tanker that serves the entire fleet.

Accordingly, it is an object of the invention to provide a guidance-light display of the type suitable for being mounted on the exterior of a lead aircraft for guiding the pilot of a trailing aircraft into position for mechanically linking up the two aircraft, such as for aerial refueling operations, wherein the guidance-light display operates automatically during the pre-link-up approach of the trailing aircraft and continues to operate after link-up to maintain the trailing aircraft at or close to the optimum link-up position.

Another object is to provide such a guidance-light display which informs the pilot in the trailing aircraft as to his position relative to the lead aircraft in three orthogonal axes, fore-aft, elevation and azimuth.

Another object of the invention is to provide such a guidance-light display which in addition to displaying fore-aft, elevational and azimuthal position information, also displays the rate of relative movement in the fore-aft direction so as to indicate to the trailing pilot the rate at which he is closing on, or falling behind the lead aircraft.

A further object of the invention is to provide such a guidance-light display which presents sufficient pilot guidance information so as to enable the pilot of the trailing aircraft to fly into a predetermined link-up position with respect to the lead aircraft under adverse visibility conditions including darkness.

Also it is an object to provide a guidance-light display which is capable of automatic operation in response to position-sensing equipment that automatically senses and calculates the relative position between the lead and trailing aircraft, and does so not only after link-up of the aircraft, but also prior to link-up when the trailing aircraft is approaching the desired link-up position.

Additionally, it is an object to provide a guidance-light display which presents elevational, azimuthal and fore-aft position information along with fore-aft rate information in a format that is capable of being quickly and easily assimulated by the pilot of the trailing aircraft so as to enable him to make timely and accurate flight corrections to attain and thereafter maintain the desired link-up orientation between the aircraft. A related object is to provide a more effective guidance-light display, to enable the pilot to stay within predetermined distances from the optimum link-up position and thereby decrease the likelihood of premature disconnects, which occur automatically when the trailing aircraft moves too far from the optimum link-up position.

SUMMARY OF THE INVENTION

It has been discovered that a certain balance must be achieved between too much information and too little information, in presenting visual guidance information to the pilot of the trailing aircraft. Insufficient information will make the link-up, at best, difficult, and under adverse conditions impossible, whereas too much information inhibits the needed, quick assimilation of the display by the receiver pilot in order to react and guide the receiver aircraft into proper position. Moreover, the guidance information must be presented in a format that is capable of being quickly and accurately interpreted by the pilot. These factors of proper balance and proper presentation are achieved in the present invention by a guidance-light display system which includes elevational, azimuthal and fore-aft position information, and fore-aft rate information. These four parameters have been found essential to effectively guide the receiver pilot, during daylight or darkness, into proper position relative to a lead aircraft. They are displayed in an easily assimulated format which includes an integrated fore-aft position and fore-aft rate indicating array of lights, and an integrated elevational and azimuthal light array. The fore-aft position and rate indicating array comprises an elongate array of lights oriented lengthwise of the fuselage and to one side of the fuselage's center line. The elevational and azimuthal array is comprised of a series of arrow-shaped lights arranged in a cross pattern disposed adjacent the fore-aft array, on the other side of the fuselage's center line, in which one line of lights of the cross is disposed lengthwise of the fuselage and represents elevational position and the other line of lights of the cross is arranged crosswise of the fuselage and represents azimuthal information.

These two associated arrays of lights are operated automatically in response to a system for sensing the relative position and rate between the two aircraft, which is known per se. The sensing system is carried by the lead aircraft and automatically and substantially instantaneously develops electrical signals representing the position information. These electrical information signals are processed in a programmed computer which automatically develops coded signals that selectively operate the various guidance lights of both arrays. Decoding logic circuitry receives the coded output signals from the programmed computer and converts the coded signals into light operating signals which are connected to the lights.

Preferably, the fore-aft position and rate indicating array comprises a plurality of position-representing lights arranged at longitudinally spaced intervals along the fuselage which are selectively illuminated to represent the instantaneous fore-aft position of the trailing aircraft with respect to a predetermined link-up envelope associated with the lead aircraft. Superimposed on such fore-aft position indicating lights, are a plurality of rate representing lights which are sequentially strobed, either forward or aft, to represent that the trailing aircraft is respectively closing on or falling behind the link-up envelope. Moreover, these rate indicating lights are strobed at a frequency that is proportional to the rate of closing or falling behind.

For aerial refueling purposes, the link-up envelope surrounds the nozzle end of a refueling boom projecting from the belly of the lead aircraft, and the display of guidance information is derived from the relative position between the end of the boom and the location of a refueling receptacle on the trailing aircraft to which the boom is to be coupled. The envelope of space is divided up into a plurality of three-dimensional cue zones, in which each cue zone has a known positional relationship to the end of the boom which is located at the center of the envelope. The cue zones are arranged in space so as to be fore and aft, up and down, and right and left of the envelope's center and each cue zone is associated with one of the lights in the guidance light display. In operation, position data is developed by the sensor instrumentation and fed to the computer apparatus where such data is compared with the stored data representing the cue zones. As the refueling receptacle on the trailing aircraft, moves into one of the cue zones, the computer apparatus automatically outputs a coded signal signifying that that particular cue zone has been entered. Immediately thereupon decoding circuitry processes the coded signal and turns on the associated light in the display.

Rate information in the fore-aft axis is similarly developed by the sensor system and processed by the computer and decoding circuitry to control the direction and frequency of strobing of rate indicating lights.

The fore-aft array preferably includes a series of position-representing lights in the shape of bars oriented crosswise of the longitudinal dimension of the array. As the fore-aft position between the trailing aircraft and link-up envelope changes, the illumination of the bar-shaped lights is correspondingly changed to show a moving light pattern along the display. A square-shaped center indicator light is superimposed at the middle of the fore-aft array and when the illuminated bar-shaped light is aligned with the center indicator then a perfect fore-aft position has been attained.

The preferred format of the elevation-azimuth array takes the form of two intersecting lines of lights, arranged in a cross pattern, in which each line of lights is formed by a series of arrow-shaped lights all pointing to a centermost position of the array at which the lines cross. The centermost lights of the array are arranged to form a composite light indicator composed of four symetrical arrow-shaped segments which in composite appear as a square. When the trailing aircraft is at the center of the envelope, in both elevation and azimuth, all four center lights that form the composite center square indicator are illuminated. As the trailing aircraft drifts away from the centered position, either to the left or right, or up or down, one or more of these center lights are extinguished and arrow-shaped lights outside of the center square indicator are illuminated to inform the pilot of his position, and at the same time commanding him to move in the direction necessary to again center the aircraft.

The guidance-lights of both the fore-aft array and the elevation-azimuth array are arranged in patterns, and are color coded, so as to indicate to the pilot, the position of the trailing aircraft with respect to the outer limits of the link-up envelope. As mentioned, aerial refueling equipment is designed to automatically decouple if the receiver aircraft moves too far from an optimum refueling orientation with respect to the tanker aircraft. The guidance-light display is thus configured and operated to provide an effective guidance aid for assisting the pilot of the receiver aircraft to stay within the link-up envelope and thereby reduce the likelihood of premature, automatic decouplings.

BRIEF DESCRIPTION OF THE DRAWINGS

To provide a complete disclosure of the invention, reference is made to the appended drawings and the following description of one particular and preferred embodiment.

FIG. 3 is an enlarged plan view of the arrayed lights of the guidance-light display which is shown on the aft belly of the lead aircraft in FIG. 1.

FIG. 4 is a generalized block diagram of the instrumentation for controlling the lights of the display.

FIG. 5 is a diagrammatic view illustrating the division of the three-dimensional space surrounding the end of the refueling boom into a plurality of three-dimensional cue zones which are used by the instrumentation of FIG. 4 to selectively control the lights of the display as the trailing aircraft approaches the boom and enters the various cue zones.

FIG. 10 is a flow chart of the computer program for controlling the computer shown in the instrumentation of FIG. 4.

DETAILED DESCRIPTION

Figure 1:
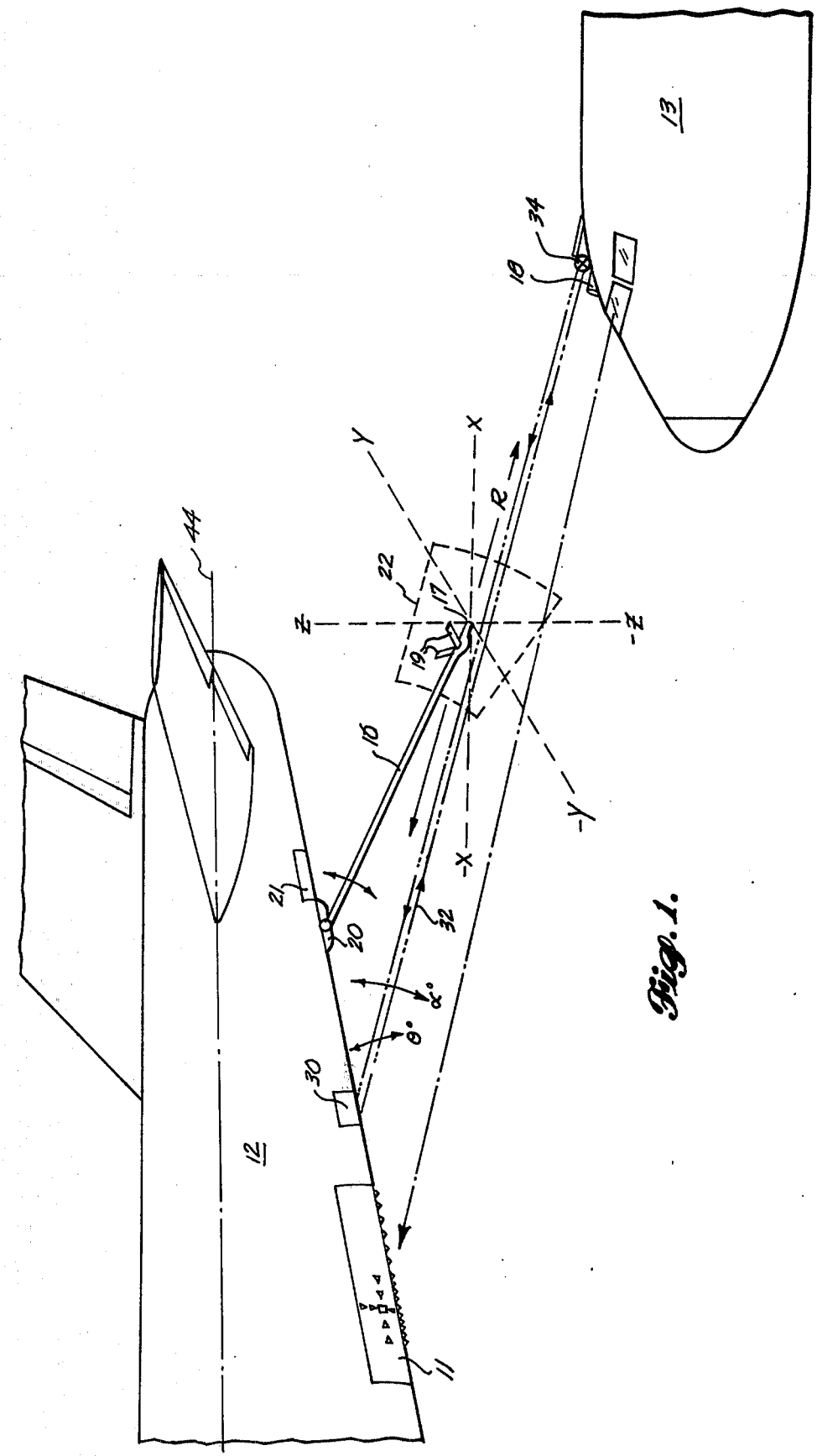
FIG. 1 is a fragmentary, pictorial diagram illustrating two aircraft manuvering into position for in-flight refueling in which the lead aircraft (in this case, the tanker) is equipped with the guidance-light display apparatus of the invention for guiding the pilot of the trailing aircraft (in this case, the fuel receiving aircraft) into a link-up position.

With reference to FIG. 1, a guidance-light display 11 of the invention is mounted on the aft belly of a tanker aircraft 12 for visually guiding a pilot of a receiver aircraft 13 into a position, below and aft of aircraft 12, for effecting a mechanical refueling link-up between the two aircraft. While the invention is, in general, useful as a pilot guidance aid for a variety of in-flight maneuvers between two aircraft, the embodiment of the invention described herein is particularly suited for use in an aerial refueling operation, and associated guidance system, of the type disclosed in U.S. Pat. No. 3,917,196. In such an operation, the tanker aircraft 12 (in the lead position) carries a fuel dispensing boom 16, depending downwardly and rearwardly from aircraft 12, that is to be mechanically coupled to a fuel receptacle 18 mounted above the cockpit of receiver aircraft 13 (in the trailing position).

As described in that patent, the receiver aircraft 13 approaches the tanker aircraft 12 from below and behind and advances to a position in which receptacle 18 is proximate to a nozzle end 17 of boom 16 which has been lowered from the belly of aircraft 12. Boom 16 is equipped with ruddevators 19 which can be remotely controlled by a boom operator sitting within the belly of aircraft 12 and observing the position of boom 16 and aircraft 13 through a window 21. A swivelably mounted end 20 of boom 16 allows the nozzle end 17 of the boom to be moved up or down, and right or left in order to line up the boom with receptacle 18. Additionally, boom 16 is telescopically extendable so that once nozzle end 17 is lined up with receptacle 18, the boom can be extended into coupling position. The extendability and swivelability of boom 16 enable limited fore-aft, right-left and up-down movement between receptacle 18 and aircraft 12 after the link-up has been effected and during the transfer of fuel.

The permissible limits within which aircraft 13 and more particularly receptacle 18 can vary with respect to aircraft 12 are defined by the boundaries of a three-dimensional refueling envelope 22 surrounding the nozzle end 17 of boom 16 when it is in a nominal position relative to aircraft 12. The nominal position is defined by boom 16 lying within a vertical plane passing through the longitudinal axis 44 of the fuselage of aircraft 12 (i.e., neither swung to the right nor the left), by a predetermined amount of extension of the boom and by a predetermined angle of downward and rearward projection of the boom relative to axis 44. When in such nominal position, nozzle end 17 of the boom is located at a point that is referred to hereinafter as the center of the refueling envelope 22. As the receiver aircraft 13 approaches refueling envelope 22, the pilot of that aircraft will attempt to fly into a position which brings receptacle 18 to the so-called center of the envelope.

For this purpose, and in accordance with the invention, guidance-light display 11 operates in conjunction with position sensing instrumentation, provided in the presently disclosed embodiment by an electro-optical sensor system 30 of the type described in the above-mentioned U.S. Pat. No. 3,917,196. As disclosed therein, sensor system 30 includes a laser (not shown) carried by aircraft 12 and arranged and operated to project a light beam 32 toward a retroreflector 34 mounted on aircraft 13 adjacent receptacle 18. Beam 32 is reflected back to optical detectors (not shown) forming components of system 30 and disposed adjacent the beam producing laser. Light beam 32 is modulated by a continuous wave signal and the affect that the movement of retroreflector 34 has on the reflected beam causes changes in the modulation signal which are received and processed by system 30 to develop electrical signals representing the instantaneous position of retroreflector 34 with respect to aircraft 12. The position signals include range, azimuth and elevation information. The range parameter refers to the straight line distance between retroreflector 34 and the position at which the laser of system 30 is mounted on aircraft 12, namely on the aft belly of aircraft 12 between display 11 and end 20 of boom 16. The azimuth perameter represents the angular location ($\theta°$) of receptacle 34 to the left or right of a vertical plane passing through the longitudinal axis 44 of aircraft 12. The elevation parameter represents the angular position ($\alpha°$) of receptacle 34 relative to axis 44.

As described more fully herein, the signal information developed by system 30 and representing range, azimuth and elevation is processed by a programmed computer to convert the format of such information into equivalent parameters representing the relative position of retroreflector 34 in orthogonal cartesian coordinates of X, Y and Z centered at the above-defined center point of refueling envelope 22 and thus at the nominal position of the nozzle end 17 of boom 16. In the cartesian coordinate system, an X axis which extends parallel to the longitudinal axis 44 of aircraft 12, is used as the fore-aft position measurement and the time derivative of this X axis measurement is taken to develop a signal representing the relative fore-aft rate (velocity) between the two aircraft.

Figure 2:
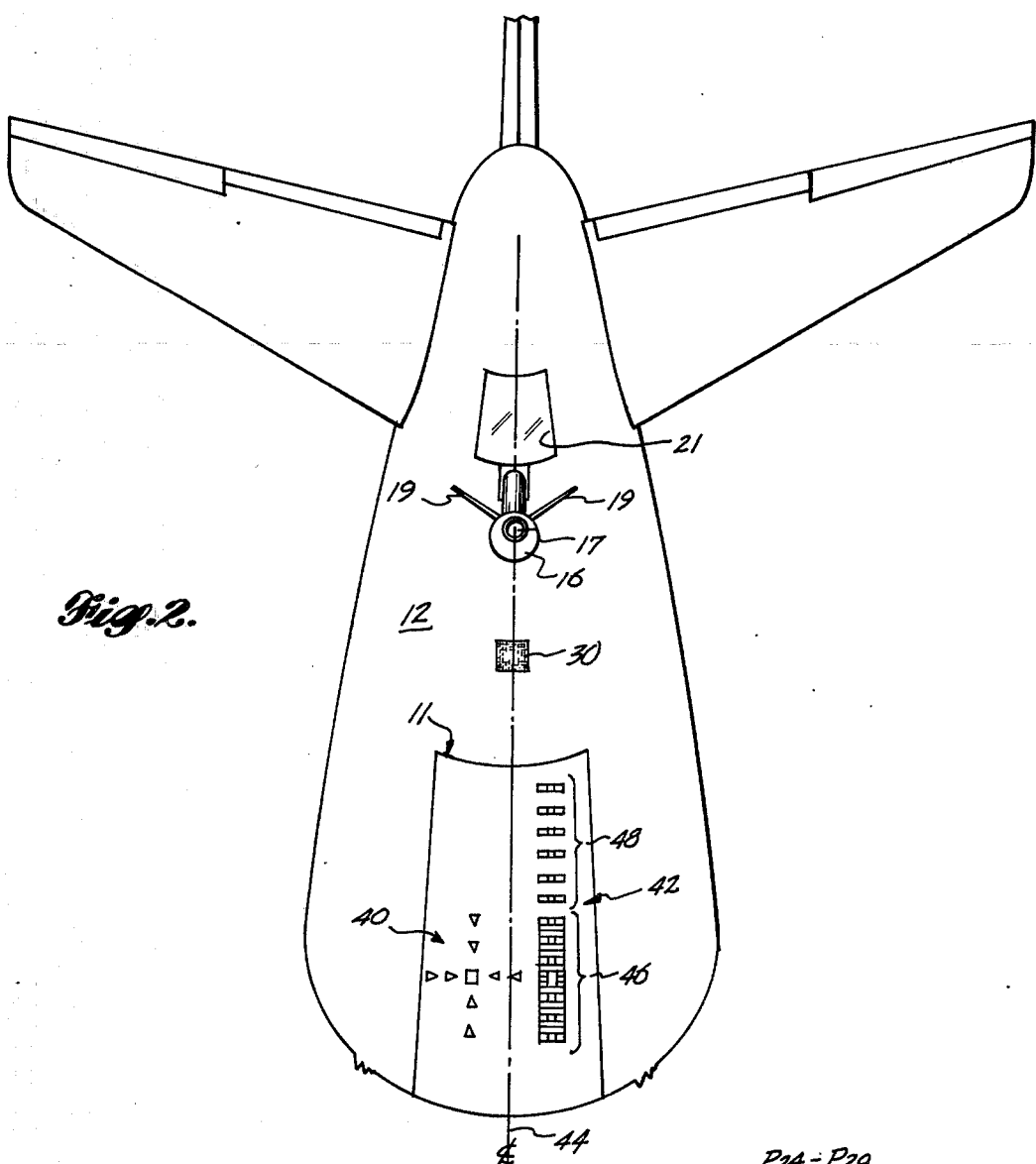
FIG. 2 is a fragmentary view of the lead aircraft as viewed from a position below ad aft of the tail section.

As the receiver aircraft 13 approaches the refueling envelope 22, he has a view of the tanker belly of the tanker aircraft 12 that is generally depicted in FIG. 2. As shown therein, the pilot of the receiver aircraft is in a position to readily observe the guidance information presented on display 11 while maintaining complete visual contact with aircraft 12. Display 11 has two co-functioning light arrays 40 and 42 generally arranged on opposite sides of axis 44, if projected down the belly of the aircraft in a vertical plane. Array 40 displays the elevation and azimuth positions and is hereinafter referred to as the elevation-azimuth array. The lights of array 40 are arranged in two intersecting lines including a first line of lights representing the elevation position which are arranged lengthwise of the fuselage of aircraft 12 and thus parallel to axis 44, and a second line of lights representing the azimuth position and being arranged crosswise with respect to the fuselage and intersecting the first line of lights to form a symmetrical cross-shaped pattern in which each light module is in the shape of an arrow pointing toward the center of the array.

Array 42 is a composite array, but is principally formed by a series of bar-shaped lights, which individually are disposed crosswise of the fuselage, and collectively are disposed in line extending lengthwise of the fuselage. Each of the bar-shaped lights represents the relative fore-aft position of the receiver aircraft.

Additionally, array 42 includes a plurality of rate indicating strobe lights (S1–S12 as shown in FIG. 3) which are sequentially strobed in a direction (either toward the nose or tail of aircraft 12) and at a frequency which represents the relative velocity between the two aircraft. Thus, the pilot of the receiver aircraft is informed of not only his relative fore-aft position, but also is given a sense of the rate at which his aircraft is closing (approaching) or opening (falling behind the tanker aircraft 13).

Configuration of Light Arrays 40 and 42

With reference to FIG. 3, light arrays 40 and 42 of display 11 are depicted in greater detail. As shown therein for array 40, a line of six elevation indicating light modules EL1–EL6 include a pair of spaced apart, arrow-shaped light modules EL1 and EL2 which are selectively illuminated to inform the pilot that he is too high, and by virtue of the orientation of the arrows, pointing toward the center of the array, command the pilot to drop his aircraft down.

EL1 is the outer elevation indicating light on the high side and is selectively illuminated to inform the pilot that he is either at the upper limit or above the refueling envelope, and has the following illumination modes: dim white (DW), blinking amber (BL. AMB.), blinking red (BL. RED) and solid red (SLD. RED), which represent various elevational positions with respect to the envelope.

EL2 lies inwardly of EL1 and is used to represent less severe elevation deviations on the high side. The light modes for EL2 are dim white (DW) and green (GRN.).

Modules EL6 and EL5 are identical to modules EL1 and EL2, respectively, except for the orientation of the arrows which point upwardly to the center of array 40. EL6 and EL5 function in the same manner as EL1 and EL2, respectively, to indicate elevation deviations below the center of the refueling evelope and command the pilot to fly up.

The line of six azimuth indicating lights AZ1–AZ6 include two pairs of modules AZ1, AZ2, and AZ5, AZ6 which are identical in construction and function to the two pairs of outer and inner elevation modules EL1, EL2 and EL5, EL6. AZ1 and AZ2 represent azimuthal deviations to the left of the envelope center and command the pilot to fly right, while AZ5 and AZ6 represent azimuthal deviations to the right of center and command the pilot to fly left.

The four centermost light modules EL3, EL4, AZ3 and AZ4 are configured and arranged to form four interfitting, roughly arrow-shaped, quadrant-like segments of a composite square-shaped center indicator 50 wherein the apexes of the arrow-shaped modules coincide at the center of the square. The two elevation light modules EL3 and EL4 are in opposing positions in the square and are aligned with the inner and outer elevation lights EL1, EL2, EL5 and EL6. The azimuth light modules AZ3 and AZ4 are similarly positioned in opposing relation and are in alignment with the inner and outer azimuth light modules AZ1, AZ2, AZ5 and AZ6. Each of modules EL3, EL4, AZ3 and AZ4 is independently controlled and has a plurality of operating modes including dim white and green. As described more fully herein, all four modules EL3, EL4, AZ3 and AZ4 are illuminated green when the pilot has achieved perfect azimuth and elevation positioning.

With further reference to FIG. 3, the bar-shaped fore-aft light modules of array 42 are designated P5-P29, of which modules P5-P23 form a contiguous group of envelope position lights 46 and function to display the fore-aft position of aircraft 13 within the fore-aft limits of refueling envelope 22. Modules P24-P29 form a relatively spaced apart group of aft position lights 48 and function to display the position of aircraft 13 aft of refueling envelope 22. Each of modules P6-P23 has two operating modes, green and off. P5 has two modes, dim white and bright white. At the center of group of lights 46 is a center square light module 52 which is superimposed over the center portions of bar-shaped modules P13, P14 and P15. Module 52 has two illumination modes, dim white and green, and serves as a reference point for guiding the pilot of aircraft 13 into the fore-aft center of refueling envelope 22.

Rate indicating strobe lights S1–S12 are positioned at substantially equal, longitudinal increments along the fore-aft array 42, each such strobe light being superimposed on, and at the center of, one of the bar-shaped light modules P5–P29. Each of the aft position lights 48 has one of lights S7–S12 superimposed thereon, while the remaining strobe lights S1–S6 are associated with only certain of the modules forming group 46, namely modules P5, P8, P11, P17, P20 and P23 in order to maintain the uniform longitudinal spacing between the strobe lights that is established by the spacing of strobe lights S7–S12 in group 48.

With reference to FIG. 4, guidance-light display 11 is operated automatically in response to position signals developed by electro-optical sensor system 30, wherein such signals are processed by a programmed computer 60 and applied to display 11 by means of interface logic circuitry 62. The position indicating signals are compared in computer 60, with a plurality of three-dimensional cue zones defined in the free space adjacent to and within envelope 22, the data for which is permanently stored in computer 60. As the retroreflector 34 (and thus receptacle 18) of receiver aircraft 13 pass into and through each of the defined cue zones, computer 60 outputs a digitally encoded signal instructing one or more of the lights of display 11 to be illuminated, according to a predetermined illumination mode, such as dim white, bright white, green, etc. The digitally encoded signals are decoded by interface logic circuitry 62 to develop light control signals which are fed to individual lamps in the various light modules of display 11 for automatically effecting the desired illumination patterns.

As shown in FIG. 5, the above-mentioned cue zones are simply the result of dividing the free space around the center of envelope 22 into a matrix of three-dimensional volumes having predetermined orientations with respect to the center of envelope 22. The division of the free space includes a series of major cue zones, including zone No. 1 which lies forward of the refueling envelope 22, zone No. 2 which is co-extensive with the refueling envelope 22, and zones Nos. 3–8 which are at progressively increasing distances aft of envelope 22. When viewed together, major cue zones Nos. 3–8 form an imaginary three-dimensional tunnel having a generally square shaped cross section which guides the receiver aircraft 13 toward and into the center of zone No. 2 which constitutes the refueling envelope 22. If the aircraft overshoots cue zone No. 2 and enters cue zone No. 1, then link-up is impossible and the pilot of the trailing aircraft must back off.

As described in greater detail below in the section dealing with the programming of computer 60, cue zones Nos. 1–8 lie generally fore and aft and thus are selected using the values of the X coordinate, measured from the center of the refueling envelope 22. Exemplary values of the X coordinate for the major cue zones Nos. 1–8 are set forth hereinafter in the section dealing with the programming of computer 60. Briefly, cue zone No. 1 lies within the volume of space surrounding boom 16 and lying forwardly of refueling envelope 22. Cue zones 1 and 2 have a center line that is coincident with the lengthwise axis of boom 16 and thus these zones are oriented askew to the X axis. Cue zones Nos. 3–5 lie at progressively increasing distances aft of cue zone No. 2 (i.e., refueling envelope 22) and have a center line that lies parallel to the X axis. The aftmost cue zone Nos. 6–8 lie at increasing aft distances from cue zone 5 and have a center line that is angled downwardly and rearwardly and are thus also oriented askew to the X axis. As the receiver aircraft 13 approaches the center of the refueling envelope, it will successively pass through cue zones Nos. 8, 7, 6, 5, 4, 3, and enter cue zone No. 2 and thus the refueling envelope. If the approach is along the center line of these major cue zones, the coordinate values of Y and Z will remain zero.

In addition to the division of the free space into the major cue zones based on the value of the X coordinate, each of these cue zones are further divided according to cue zones in Z (elevation) and Y (azimuth). Thus, as shown for cue zone No. 2 (envelope 22), the zones in Z include Z2–Z10. A zone Z1 lies above envelope 22 and a zone Z11 lies below envelope 22. Also within envelope 22 are zones Y2–Y10. Zone Y11 lies outside envelope 22 to the right and zone Y1 lies outside of envelope 22 to the left (as viewed by the pilot approaching from the rear). Similarly, each of the other major cue zones in X are divided into cue zones in Y and Z.

During the approach, only a rough indication is needed of the position of the aircraft along the X axis and thus cue zones Nos. 3–8 each encompass a relatively large range of X coordinate values. However, upon entering refueling envelope 22, a finer division of the zones in X is needed and for this purpose, cue zone No. 2 (envelope 22) is divided into 19 subzones in X.

For convenience, these subzones in X are noted by code numbers X5–X22 along the lower margin of envelope 22 and are numbered so as to form a consecutive series of coordinate zones commencing with zones X0–4 which collectively form zone No. 1, and continuing with subzones X5–X25, and concluding with zones X24–X29 denoting the major cue zones Nos. 3–8. The zone and subzone numbers for X, Y and Z as shown in FIG. 3 are code numbers, used to simplify the computation performed by computer 60, and are not the actual measurement values for the X, Y and Z coordinates. Thus, X0–X29, Y1–Y11 and Z1–Z11 are code numbers which collectively identify a particular three-dmensional cue zone or cue subzone of the plurality of such zones depicted in FIG. 5. Using a program disclosed more fully hereinafter, computer 60 accepts the actual values for the X, Y and Z coordinates which represent the positon of retroreflector 34 on aircraft 13 with respect to the center of envelope 22 and automatically compares the X, Y and Z coordinates with permanently stored data within the computer which define the boundaries of the various zones and subzones in terms of X, Y and Z coordinate values. Thus, a substantially instantaneous determination is made of the zone or subzone that the retroreflector of aircraft 13 is located in during its approach to the refueling envelope.

With reference to both FIGS. 3 and 4, the dimensions of the various cue zones and their orientation with respect to the center of the refueling envelope 22 have been selected so as to cause the guidance-lights of display 11 to be automatically operated in a manner that displays sufficient position and command information to enable the pilot of aircraft 13 to smoothly approach the center of the refueling envelope, taking into consideration the inherent delay in the reaction time of the pilot to the visual information presented by the display. The sizes of the cue zones should be small enough so that the guidance-lights of display 11 change frequently enough to reflect not only the instantaneous position, but also the movement of the receiver aircraft within the zones of the approach path, but not so small as to cause display 11 to change more rapidly than can be assimulated and effectively used in operating the flight controls of the aircraft. If display 11 presented too much information, or changed too rapidly, the pilot of the receiver aircraft would soon become overworked in his attempt to satisfy the commands of the display.

In particular, it has been found that the elevation and azimuth positions are optimally divided into approximately nine zones, namely, Z2–Z10 and Y2–Y10 as shown in FIG. 5. The light modes in array 40 for the elevation modules EL1–EL6 are the same as the modes for the azimuth light modules AZ1–AZ6, and accordingly a description of the latter will suffice for both:

Assume that the aircraft 13 is oriented in the azimuthal center and from there moves left. The azimuthal indicator lights AZ1–AZ6 of array 40 operate as follows:

ZONE Z6:
The right quadrant (AZ4) and the left quadrant (AZ3) of center indicator 50 are illuminated green, and the left and righthand side inner and outer arrow-shaped modules (AZ1, AZ2, AZ5 and AZ6) are all illuminated dim white, for background.

ZONE Z5:
The lefthand quadrant (AZ3) of indicator 50 remains green, while the righthand quadrant (AZ4) goes dim white, and the inner and outer lefthand and righthand modules remain dim white.

ZONE Z4:
Now the lefthand quadrant (AZ3) of indicator 50 goes dim white, and the left inner light module (AZ2) is illuminated green, while modules AZ1, AZ5 and AZ6 remain dim white.

ZONE Z3:
Both the right and left quadrants (AZ3 and AZ4) of indicator 50 remain dim white and the left-inner module (AZ2) switches from green to dim white, and the left-outer module (AZ1) commences to blink amber at a rate of 2 hertz, and AZ5 and AZ6 remain dim white.

ZONE Z2:
The left-inner module (AZ2), and both the right and left quadrant modules (AZ3 and AZ4) of indicator 50 stay dim white, while the left-outer module (AZ1) begins to blink red at 4 hertz, annd AZ5 and AZ6 remain dim white.

ZONE Z1:
Aircraft 13 has now moved out of the refueling envelope and the left-outer module (AZ1) is switched to solid red, while AZ2–AZ6 stay dim white.

As the aircraft moves right from zone Z1 back toward the center position, the illumination modes of the azimuth modules repeat the above sequence in the reverse order. For indicating movement of the aircraft to the right of center, through zones Z7–Z11, the display operates in the same manner except that the right-hand light modules AZ4–AZ6 become the active indicators, while the lefthand modules remain dim white.

For array 42, the bar-shaped position indicator modules P5–P29 operate as follows:

Aft position indicator modules P24–P29 are normally dim white, and are individually switched to bright white as the aircraft 13 enters an associated zone in X, where zones X29–X24 correspond respectively to light modules P29–P24. Thus, assuming that the aircraft enters cue zone No. 8 and moves progressively through cue zones Nos. 7–3, modules P29–P24 will sequentially assume a bright white illumination and then revert to the normal dim white illumination.

When the aircraft enters refueling envelope 22, light modules P6–P23 (which are dim white for background until envelope 22 is entered) are individually illuminated green to represent the fore-aft position of the aircraft within the refueling envelope 22 as marked off by subzones X6–X23. Thus, assuming that the aircraft enters envelope 22 (FIG. 5) and progressively advances forwardly through the envelope, subzones X23–X6 will be successively entered, causing the corresponding light modules P23–P6 to be sequentially illuminated green. Subzone X5, at the forward boundary of envelope 22 is a special case and when entered, module P5 is switched from dim white to bright white to inform the pilot that he is about to break through the forward boundary of the envelope.

Also, at the time that the aircraft enters the refueling envelope, the center square module 52 switches from a normal dim white to green and remains green so long as the aircraft remains within the envelope. A perfect fore-aft position will be represented by an alignment of the green bar displayed by modules P23–P6, and the center square module 52, or, in other words, the simultaneous green illumination of module 52 and module P14.

The fore-aft position array 42 operates in response to fore-aft boundaries of the various cue zones, even though the receiver aircraft 13 may lie outside of the defined cue zones in the azimuthal or elevational planes. Thus, when aircraft 13 lies near the refueling envelope and is within the X defined boundaries thereof but outside the azimuth and/or elevation limits, the fore-aft array 42 will display a position within the envelope, while the elevation-azimuth array 40 will display a position outside of the refueling envelope. Similarly, the elevation-azimuth array 40 operates when aircraft 13 is outside the major cue zones in X, but still within the range of sensor 30.

The rate indicating strobe lights S1-S12 of array 42 do not depend upon the cue zones of FIG. 5, but rather are operated as described more fully herein in response to a fore-aft rate signal calculated by the time derivative of the X coordinate value and thus representing relative velocity along the fore-aft axis. In conjunction with such calculation, the direction of the velocity is determined and an appropriate plus or minus sign accompanies the calculated rate signal to cause strobe lights S1-S12 to be strobed in the proper direction. For relative velocities less than a predetermined minimum rate, a deadband is established in which the lights S1-S12 are no longer strobed but are all turned on, in a steady illumination mode to indicate to the receiver pilot that he has approximately matched the fore-aft speed of the tanker aircraft.

Description of Electro-Optical Sensor 30, Computer 60 and Interface Logic Circuitry 62

Figure 6:
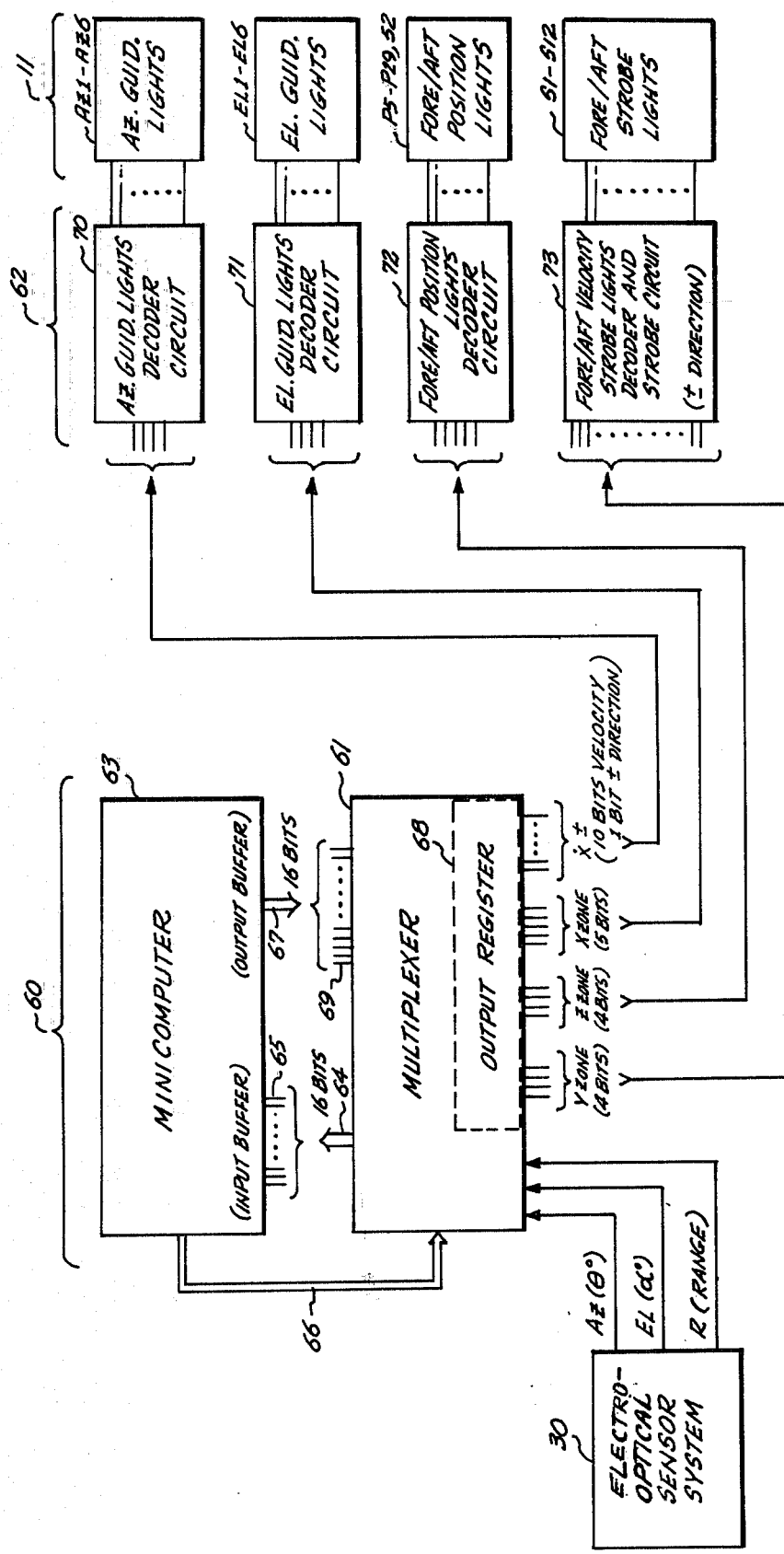
FIG. 6 is a more detailed block diagram of the instrumentation shown in FIG. 4.

FIG. 6 shows in greater detail, the arrangement of computer 60 and interface logic circuitry 62 for processing the raw position signals developed by electro-optical sensor system 30 in order to operate the guidance-lights of display 11 in accordance with the foregoing disclosure. As mentioned above, system 30 may be of the type disclosed in U.S. Pat. No. 3,917,196 employing a retroreflected laser beam emanating from the belly of the lead aircraft 12 (FIG. 1), in which signals are produced representing three parameters, namely, AZ (as an angle $\theta$ measuring angular deviation to the right or left of a vertical plane passing through the longitudinal axis 44 of aircraft 12), EL (represented by an angle $\alpha$ measuring angular deviation with respect to a horizontal plane passing through axis 44 of aircraft 12), and R (representing the range or distance between the mounting of sensor system 30 on the belly of aircraft 12 and the position of retroreflector 34 on aircraft 13). These parameters form a type of polar coordinate system which is readily converted to the orthogonal or cartesian coordinate system of X, Y and Z used in defining the cue zones of FIG. 4. AZ ($\theta°$), EL ($\alpha°$) and R (range) as outputted by system 30 are in digital form and are fed to a multiplexer 61 which, together with a minicomputer 63, forms computer 60. Multiplexer 61 organizes each of the input signals AZ, EL and R into separate, sixteen-bit words which are sequentially outputted at 64 into an internal, sixteen-bit input buffer 65 of minicomputer 63, which controls the operation of multiplexer 61 in a conventional manner via control connection 66. The input data representing AZ, EL and R is processed by a program stored within minicomputer 63, the particulars of which are described more fully hereinafter, and at the conclusion of such processing, minicomputer 63 outputs a series of three 16-bit words representing the coded signal information necessary for controlling the guidance lights of display 11. In particular, minicomputer 63 has a 16-bit output buffer 67 which loads a 24-bit output register 68 at an input 69 of multiplexer 61, again under the sequential control of minicomputer 63 via connection 66.

Thus, register 68 of multiplexer 61 contains 24 bits of light control information which are grouped as follows:

| | |
|---|---|
| Y Zone | (4 bits) |
| Z Zone | (4 bits) |
| X Zone | (5 bits) |
| X Zone (X rate) and direction (11 bits including 10 bits for rate and 1 bit for ± direction) | |

The various output words from register 68, represent, in binary encoded format, the cue zones along the X, Y and Z axes as described above in conjunction with FIG. 4, and the rate and direction of the relative movement between the two aircraft along the X axis.

The binary encoded output signals from register 68 of multiplexer 61 are decoded by decoder circuits 70, 71, 72 and 73, which in turn respectively control azimuth light modules AZ1-AZ6, elevation light modules EL1-EL6, fore-aft position light modules P5-P29 (including indicator 52), and rate indicating strobe lights S1-S12.

Figure 7:
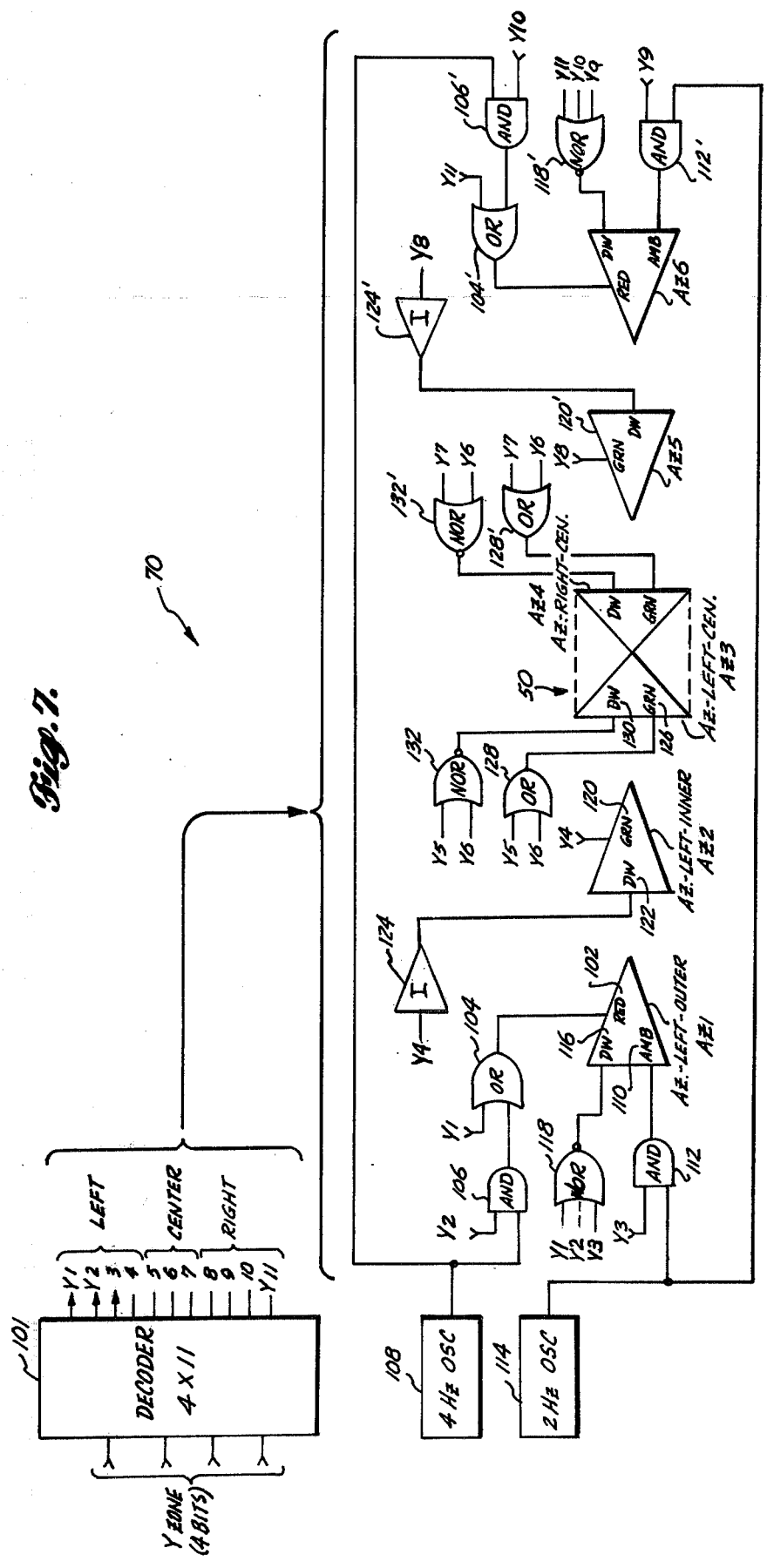
FIG. 7 is a detailed block and logic diagram of one portion of the instrumentation of FIG. 6.

Decoder circuits 70 and 71 may take the form of the logic circuit shown in detail in FIG. 7 for decoding the Y zone information for operating azimuth light modules AZ1-AZ6. An identical logic circuit is used for decoder 70 for the Z zone information used to operate elevation modules EL1-EL6. As shown in FIG. 7, the 4-bit Y zone information is decoded into 11 bits by a 4×11 decoder 101, thus producing signals Y1-Y11 representing the various cue zones in the azimuthal plane. Thus, a red lamp 102 of module AZ1 is connected to the output of a two input OR gate 104. One input of gate 104 is connected to Y1 for causing red lamp 102 to operate in a solid red illumination mode in response to the output Y1 from decoder 101. The other input of OR gate 104 is connected to an output of a two input AND gate 106. One of the inputs of gate 106 is output Y2 from decoder 101, while the other input is connected to a 4 hertz oscillator 108, which in conjunction with AND gate 106, gates the Y2 output at a 4 hertz rate and applies the resulting signal to the red lamp 102 through OR gate 104 causing module AZ1 to assume a blinking red illumination mode.

An amber lamp 110 of module AZ1 is connected to an output of a two input AND gate 112. One of the inputs to gate 112 is Y3 from decoder 101 and the Y3 signal is gated by a signal from a 2 hertz oscillator 114 causing module AZ1 to flash amber at a 2 hertz rate in response to the Y3 output signal from decoder 101. A dim white lamp 116, which may be a white lamp energized at a low illumination level, is connected to the output of a three input NOR gate 118. Connected to these three inputs are outputs Y1, Y2, Y3 so as to cause the dim white lamp 116 to be energized unless either of the color coded lamps are energized.

In module AZ2, a green lamp 120 is connected directly to the Y4 output to cause module AZ2 to be illuminated green upon receipt of a signal from the Y4 output of decoder 101. A dim white lamp 122 of module AZ2 is connected to an output of an inverter having an input connected to Y4 from decoder 101. Lamp 122 is thus energized at all times other than when green lamp 120 is on.

Module AZ3 located in the left center quadrant of indicator 50 includes a green lamp 126 connected to the output of a two input OR gate 128 which receives the signals from outputs Y5 and Y6 of decoder 101 so that AZ3 is illuminated green in response to signals from either of these decoder outputs. Conversely, a dim white lamp 130 is connected to the output of a two input NOR gate 132 which also receives decoder outputs Y5 and Y6 for causing module AZ3 to be normally illuminated dim white, unless output signals appear at Y5 or Y6.

The righthand set of azimuthal light modules AZ4, AZ5 and AZ6 have a set of logic gates, identical to the logic gates shown and described for the lefthand set of modules, and operating in response to decoder outputs Y6-Y11 which constitute the symmetrical counterparts of outputs Y1-Y6, in which Y6 represents the centermost zone. Corresponding primed reference numerals are used to identify the corresponding logic gates for operating the righthand modules.

Figure 8:
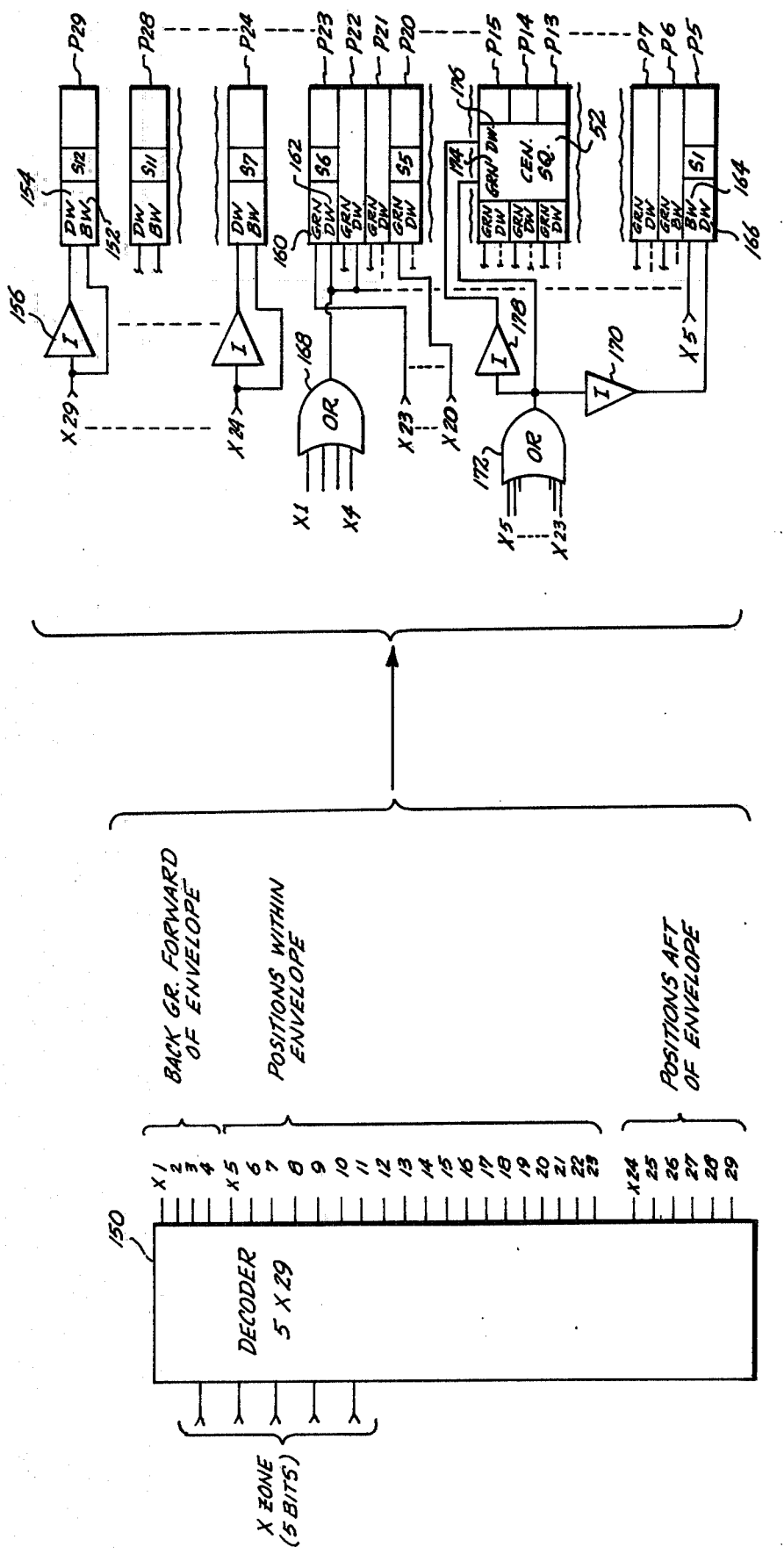
FIG. 8 is a further block and logic diagram of another portion of the instrumentation of FIG. 6.

FIG. 8 depicts the logic circuitry used in decoder circuit 72 for controlling the fore-aft light modules P5-P29 and center square indicator 52. The 5-bit X zone word is decoded in a 5×29 decoder 150 to produce outputs X1-X29 representing each of the X cue zones described above in connection with FIG. 4. The outputs from decoder 150 are applied to the light modules and associated logic circuitry shown on the righthand side of FIG. 8. The aft position indicating modules P24-P29 each include a bright white lamp and a dim white lamp, as represented by lamps 152 and 154 of module P29. The bright white lamp 152 of each module is connected directly to the associated output of decoder 150, which in the case of module P29 is the X29 output, while the dim white lamp 154 is connected through an inverter 156 to the same, associated output of decoder 150, again in this instance being X29. The bright white and dim white lamps of each of the remaining aft position indicating modules P28-P24 are similarly connected to the associated outputs X28-X24 of decoder 150. In response to a signal at any one of outputs X24-X29, the bright white lamp of the associated module is illuminated. Conversely, in the absence of a signal at the associated one of outputs X24-X29, the dim white lamp remains energized to provide background illumination of modules P24-P29. In practicing the invention a single type of lamp may be employed in each of modules P24-P29, as described more fully below in connection with FIG. 12, and the control logic for each module used to merely control the intensity at which the lamps are energized to provide the alternative dim and bright white modes.

Light modules P5-P23 indicating the fore-aft positions within the refueling envelope, each include both green and dim white lamps 160 and 162, respectively, except for module P5 which includes bright white and dim white lamps 164 and 166, respectively. The green lamps 160 of modules P6-P23 are connected directly to the associated X outputs of decoder 150, namely, X6-X23, causing the modules to be illuminated green in response to signals at these associated outputs. The dim white lamps 162 are connected in parallel to the output of a four input OR gate 168, which has its inputs connected to the decoder outputs X1-X4. Outputs X1-X4 signal that the trailing aircraft has overshot the refueling envelope and in accordance with the above disclosure, causes the fore-aft modules P6-P23 representing the envelope positions to be illuminated dim white to display a reference background.

Light module P5 representing the X zone and the forward limit of the refueling envelope has its bright white lamp 164 connected directly to the X5 output of decoder 150, causing module P5 to be illuminated bright white when the trailing aircraft is on the verge of breaking out of the refueling envelope and passing into cue zone No. 1 (FIG. 4). Dim white lamp 166 is connected through an inverter 170 to an output of a multi-input OR gate 172, which in turn has its inputs connected to outputs X5-X23 from decoder 150. So long as there is an output signal available on any one of the outputs X5-X23, the output of the OR gate is high, while the output of inverter 170 is low, thus extinguishing lamp 166. If outputs X5-X23 are all low, indicating that the trailing aircraft is either aft or forward of the refueling envelope, then the output of OR gate 172 is low and the output of inverter 170 is high, energizing dim white lamp 166 for outlining the forward limit of the display envelope.

Center square indicator 52 includes a green lamp 174 and a dim white lamp 176. Lamp 174 is connected to the output of OR gate 172 to cause indicator 52 to be illuminated green when a high logic signal appears at any one of the decoder outputs X5-X23, or in other words, when the trailing aircraft has moved within the fore-aft boundaries of the refueling envelope. Conversely, dim white lamp 176 is connected through an inverter 178 to the output of OR gate 172, to cause indicator 52 to be illuminated dim white at all times other than when green lamp 174 is energized.

Figure 9:
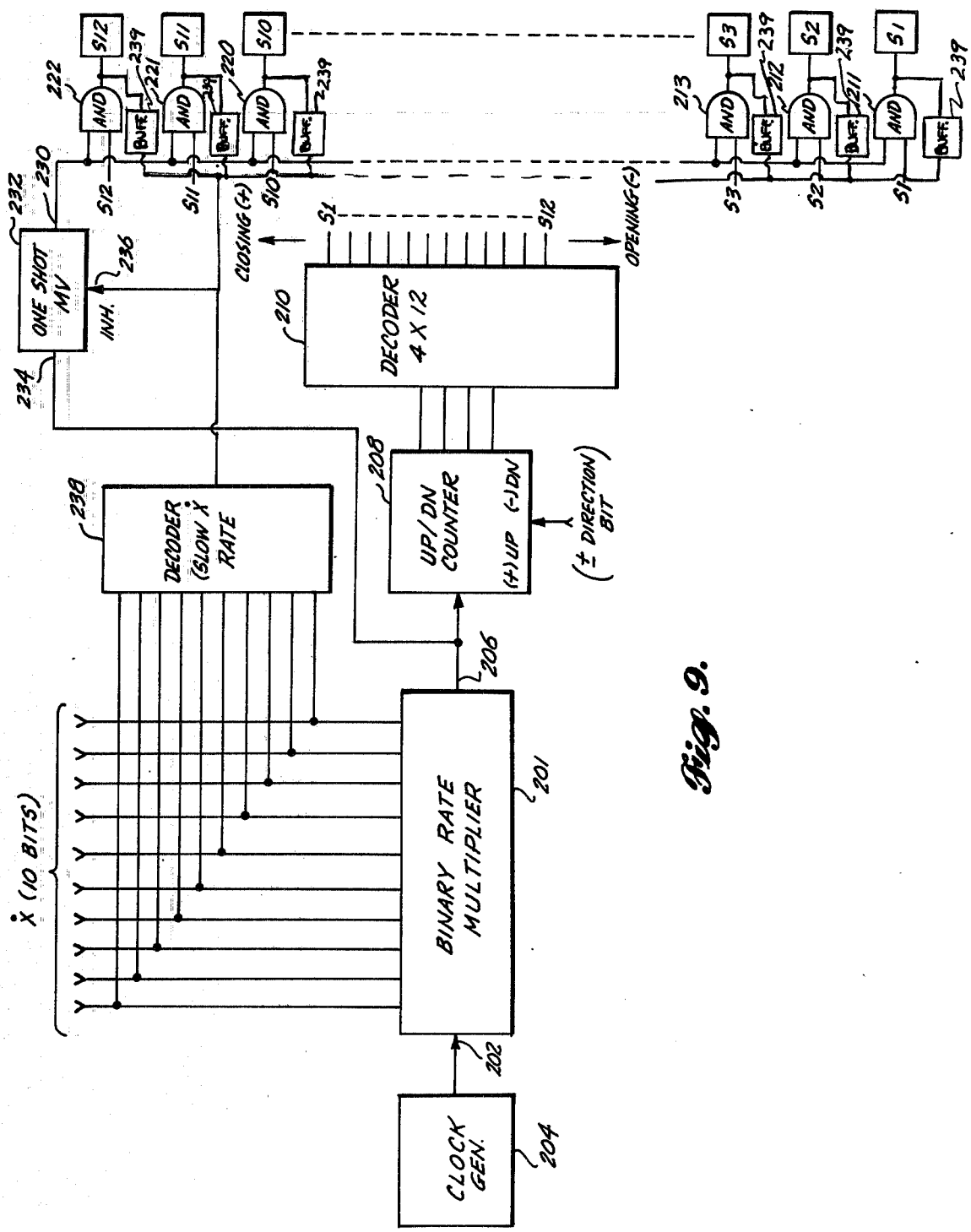
FIG. 9 is still a further block and logic diagram of still another portion of the instrumentation of FIG. 6.

Decoder and strobe circuit 73 of the interface logic circuitry 62 may be provided by the logic circuit depicted in FIG. 9 in which the 10-bit fore-aft rate signal ($\dot{X}$) is applied to the rate controlling inputs of a binary rate multiplier 201. An input 202 of multiplier 201 receives a pulse train from clock generator 204 and produces at an output 206, an altered pulse train having a frequency that varies as a function of the binary, 10-bit word representing $\dot{X}$. Multiplier 201 is a conventional, commercially available device which multiplies the input frequency by a factor $M/N^2$, where N is the number of binary bit inputs (or stages) of the multiplier and where $M=$(most significant input bit)$\times 2^{N-1}+$(the second most significant bit)$\times 2^{N-2} \ldots +$(least significant bit)$\times 2^0$.

The altered frequency of the pulse train at output 206 is fed to the input of an up/down counter 208, the counting direction of which is controlled by the sign bit representing the plus or minus direction of the $\dot{X}$ rate. Counter 208 is a binary counter and has a set for four binary outputs which are decoded in a 4×12 decoder 210 which has a set of twelve outputs S1-S12 corresponding to the set of the twelve strobe lights S1-S12. When the direction of counting of counter 208 is up (+), the outputs of decoder 210 are switched to a logic high in a decreasing numerical sequence commencing each counting cycle with S12 and sequencing toward S1, whereupon the cycle is repeated again starting with the output at S12. When counting down (−) the sequence at outputs S1-S12 is reversed.

The outputs S1-S12 from decoder 210 are connected to one input of each of a set of associated, two input AND gates, such as represented by gates 211, 212, 213, 220, 221 and 222, each having an output connected to the associated one of strobe lights S1-S12. The other input of each of AND gates 211-222 is connected in parallel to an output 230 of a one-shot multivibrator 232 which has its input 234 connected to receive the pulses from output 206 of multiplier 201. One-shot multivibrator 232 responds to the train of pulses from multiplier 201 and applies a strobe signal to one input of each of AND gates 211-222 for gating the one of outputs S1-S12 of decoder 210 that is then at a logic high to the associated one of lights S1-S12. The output strobing signals are thus timed with respect to the pulses from output 206 so that they occur at a proper phase with respect to the transitions of the signals at the outputs S1-S12 of decoder 210.

Multivibrator 232 also has an inhibit control input 236 which is connected to the output of a decoder 238 for detecting values of $\dot{X}$ lying below a predetermined minimum rate. For this purpose the ten bits representing $\dot{X}$ are connected as the inputs to decoder 238 which responds to a predetermined binary value of $\dot{X}$ representing the predetermined minimal rate and for all $\dot{X}$ values at or below such rate, decoder 238 produces an inhibit signal which is applied to input 236 of multivibrator 232 to inhibit the strobing of AND gates 211-222. The strobe lights S1-S12 are thus turned off when the relative velocity between the two aircraft, as represented by $\dot{X}$, falls below the predetermined minimum threshold. At the same time, the output from decoder 238 applies an enable signal jointly to a plurality of buffer circuits 239 which have their outputs connected to lights S1-S12 for turning the stobe lights all on, in a steady illumination mode. Thus, when the velocity drops below the threshold, the steady on condition of S1-S12 informs the receiver pilot that he is moving at approximately the same fore-aft rate as the tanker.

Studies have established a suitable threshold at relative velocities less than plus or minus 0.0625 feet per second. At relative closing or opening velocities within this deadband the flashing of the strobe lights is more confusing, than helpful to the pilot, and conversely the transition to the steady all on mode of S1-S12 upon entering the velocity deadband has been found by the receiver pilots to be extremely helpful.

It is also desirable to establish a maximum strobing rate for lights S1-S12 and this is achieved by selecting the 10-bit word representing $\dot{X}$ so that the maximum pulse rate produced by multiplier 201 in response to the ten input bits corresponds to the maximum desired strobe rate developed at the outputs of decoder 210. In particular it has been found that the maximum strobe rate should be attained at a relative velocity ($\dot{X}$) of 8 feet per second, at which time the frequency of the strobing will be approximately a cyclical rate of five complete cycles per second (i.e., the lights will be flashed at a frequency of five cycles per second times twelve or 60 hertz). Between the low rate threshold of 0.0625 feet per second and the maximum rate of 8 feet per second, the lights are strobed at a cyclical rate of 5/8 times the relative velocity ($\dot{X}$).

Programming of Computer 60

The guidance light cue zones as illustrated in FIG. 5 consist of fore-aft major zones Nos. 1, 2, 3, 4, 5, 6, 7 and 8. An additional major cue zone No. 9, not shown in FIG. 5, is defined aft of zone No. 8 for operating the guidance lights in a background display mode. These major zones are selected using values of X as measured from the center of the refueling envelope 22. Within each of these major zones are a number of smaller zones determined by the values of Z and Y relative to the center of the refueling envelope. X, Y and Z are all measured relative to a coordinate system centered at the nominal refueling boom center position, which in this embodiment is 51.8 feet aft of the sensor system 30 (in X) and 20 feet below system 30 (in Z). For each of these subzones, a particular light in the array is actuated as described previously.

These various major zones and subzones are defined by a series of inequalities as described immediately below and are implemented in computer 60 as described hereinafter.

Major Fore-Aft Cue Zones in X

The major X cue zones are defined in Table A. X zone code numbers 0 through 29 are shown in the right-hand column and are outputted by the computer to activate the particular light wanted.

Major Cue Zone No. 1

Cue zone No. 1 is ahead of the refueling envelope 22. If X (−0.58Z−7.07) all light modules in the display are turned to dim white except the forwardmost envelope position modules P5, which is bright white.

Subzones For X Within Major Cue Zone No. 2

Cue zone No. 2 (corresponding to envelope 22 in FIG. 5) is divided into 19 subzones which are defined by the inequalities of Taple B. The computer codes X5-X24, listed in the righthand column, are outputted by the computer to activate the particular light modules associated with such subzones.

Subzones For Z Within Major Cue Zone No. 2

Major cue zone No. 2 is also divided into 11 subzones in Z. These subzones are indicated by the inequalities as shown in Table C. Computer 60 outputs codes 1-11 corresponding numerically to the zone numbers.

Subzones For Y Within Major Cue Zone No. 2

Major cue zone No. 2 is also divided into eleven subzones in Y which are defined in Table D. As above, computer 60 outputs codes 1-11 corresponding numerically to the Y zone numbers.

Z Subzones in Major Cue Zones Nos. 3-5

The Z subzones in this case are determined by the inequalities as shown in Table E and computer 60 outputs corresponding code numbers as above.

Y Subzones in Major Cue Zones No. 3-8

The Y subzones are determined from the inequalities in Table F, and computer 60 outputs corresponding code numbers 1-11.

Z Subzones in Major Cue Zones Nos. 6-8

The Z subzones in these major cue zones are determined from the inequalities of Table G, and computer 60 outputs corresponding code numbers 1-11.

Major Cue Zone No. 9

Major cue zone No. 9 is beyond the range of the guidance light display and the light modules are turned dim white by the computer outputing code X1, 2, 3 or 4.

TABLE A

| ZONE | INEQUALITY | X OUTPUT CODE |
|---|---|---|
| 1 | $X < (-0.58Z - 7.07)$ | 1,2,3, or 4 |
| 2 | $(-0.58Z - 7.07) < X < (-0.58Z + 7.07)$ | 5–23 |
| 3 | $(-0.58Z + 7.07) < X < 16.73$ | 24 |
| 4 | $16.73 < X < 31.73$ | 25 |
| 5 | $31.73 < X < 46.73$ | 26 |
| 6 | $46.73 < X < 61.73$ | 27 |
| 7 | $61.73 < X < 76.73$ | 28 |
| 8 | $76.73 < X < 91.73$ | 29 |
| 9 | $91.73 < X$ | 1,2,3, or 4 |

TABLE B

| ZONE | INEQUALITY | OUTPUT CODE |
|---|---|---|
| 1 | $X < (-0.58Z - 7.07)$ | 1,2,3, OR 4 |
| $2_5$ | $(-0.58Z - 7.07) < X < (-0.58Z - 6.33)$ | 5 |
| $2_6$ | $(-0.58Z - 6.33) < X < (-0.58Z - 5.58)$ | 6 |
| $2_7$ | $(-0.58Z - 5.58) < X < (-0.58Z - 4.48)$ | 7 |
| $2_8$ | $(-0.58Z - 4.48) < X < (-0.58Z - 4.09)$ | 8 |
| $2_9$ | $(-0.58Z - 4.09) < X < (-0.58Z - 3.35)$ | 9 |
| $2_{10}$ | $(-0.58Z - 3.35) < X < (-0.58Z - 2.60)$ | 10 |
| $2_{11}$ | $(-0.58Z - 2.60) < X < (-0.58Z - 1.86)$ | 11 |
| $2_{12}$ | $(-0.58Z - 1.86) < X < (-0.58Z - 1.11)$ | 12 |
| $2_{13}$ | $(-0.58Z - 1.11) < X < (-0.58Z - 0.37)$ | 13 |
| $2_{14}$ | $(-0.58Z - 0.37) < X < (-0.58Z + 0.37)$ | 14 |
| $2_{15}$ | $(-0.58Z + 0.37) < X < (-0.58Z + 1.12)$ | 15 |
| $2_{16}$ | $(-0.58Z + 1.12) < X < (-0.58Z + 1.86)$ | 16 |
| $2_{17}$ | $(-0.58Z + 1.86) < X < (-0.58Z + 2.60)$ | 17 |
| $2_{18}$ | $(-0.58Z + 2.60) < X < (-0.58Z + 3.35)$ | 18 |
| $2_{19}$ | $(-0.58Z + 3.35) < X < (-0.58Z + 4.09)$ | 19 |
| $2_{20}$ | $(-0.58Z + 4.09) < X < (-0.58Z + 4.84)$ | 20 |
| $2_{21}$ | $(-0.58Z + 4.84) < X < (-0.58Z + 5.58)$ | 21 |
| $2_{22}$ | $(-0.58Z + 5.58) < X < (-0.58Z + 6.33)$ | 22 |
| $2_{23}$ | $(-0.58Z + 6.33) < X < (-0.58Z + 7.07)$ | 23 |
| $2_{24}$ | $(-0.58Z + 7.07) < X$ | 24 |

TABLE C

| ZONE, CODE | INEQUALITY |
|---|---|
| 1 | $Z > (0.84X + 8.99)$ |
| 2 | $(0.84X + 8.99) > Z > (0.78X + 7.01)$ |
| 3 | $(0.78X + 7.01) > Z > (0.73X + 5.13)$ |
| 4 | $(0.73X + 5.13) > Z > (0.67X + 3.34)$ |
| 5 | $(0.67X + 3.34) > Z > (0.62X + 1.63)$ |
| 6 | $(0.62X + 1.63) > Z > (0.53X - 1.57)$ |
| 7 | $(0.53X - 1.57) > Z > (0.49X - 3.08)$ |
| 8 | $(0.49X - 3.08) > Z > (0.45X - 4.54)$ |
| 9 | $(0.45X - 4.54) > Z > (0.40X - 5.95)$ |
| 10 | $(0.40X - 5.95) > Z > (0.36X - 7.33)$ |
| 11 | $(0.36X - 7.33) > Z$ |

TABLE D

| ZONE | INEQUALITY |
|---|---|
| 1 | $(-0.309X - 10.64) > Y$ |
| 2 | $(-0.245X - 8.44) > Y > (-0.309X - 10.64)$ |
| 3 | $(-0.183X - 6.29) > Y > (-0.245X - 8.44)$ |
| 4 | $(-0.121X - 4.17) > Y > (0.183X - 6.29)$ |
| 5 | $(-0.0605X - 2.08) > Y > (-0.121X - 4.17)$ |
| 6 | $(+0.0605X + 2.08) > Y > (-0.605X - 2.08)$ |
| 7 | $(0.121X + 4.17) > Y > (0.0605X + 2.08)$ |
| 8 | $(0.183X + 6.29) > Y > (0.121X + 4.17)$ |
| 9 | $(0.245X + 8.44) > Y > (0.183X + 6.29)$ |
| 10 | $(0.309X + 10.64) > Y > (0.245X + 8.44)$ |
| 11 | $Y > (0.309X + 10.64)$ |

TABLE E

| ZONE | INEQUALITY |
|---|---|
| 1 | $Z < -3.95$ |
| 2 | $-3.95 < Z < -2.253$ |
| 3 | $-2.53 < Z < -1.11$ |
| 4 | $-1.11 < Z < .28$ |
| 5 | $.28 < Z < 1.67$ |
| 6 | $1.67 < Z < 4.45$ |
| 7 | $4.45 < Z < 5.84$ |

TABLE E-continued

| ZONE | INEQUALITY |
|---|---|
| 8 | $5.84 < Z < 7.23$ |
| 9 | $7.23 < Z < 8.65$ |
| 10 | $8.65 < Z < 10.07$ |
| 11 | $10.07 < Z$ |

TABLE F

| ZONE | INEQUALITY |
|---|---|
| 1 | $-12.28 > Y$ |
| 2 | $-9.74 > Y > -12.28$ |
| 3 | $-7.26 > Y > -9.74$ |
| 4 | $-4.81 > Y > -7.26$ |
| 5 | $-2.40 > Y > -4.81$ |
| 6 | $+2.40 > Y > -2.40$ |
| 7 | $+4.81 > Y > 2.40$ |
| 8 | $7.26 > Y > 4.81$ |
| 9 | $9.74 > Y > 7.26$ |
| 10 | $12.28 > Y > 9.74$ |
| 11 | $Y > 12.28$ |

TABLE G

| ZONE | INEQUALITY |
|---|---|
| 1 | $(.194X - 13.02) > Z$ |
| 2 | $(.194X - 11.6) > Z > (.194X - 13.02)$ |
| 3 | $(.194X - 10.18) > Z > (.194X - 11.6)$ |
| 4 | $(.194X - 8.79) > Z > (.194X - 10.18)$ |
| 5 | $(.194X - 7.4) > Z > (.194X - 8.79)$ |
| 6 | $(.194X - 4.62) > Z > (.194X - 7.4)$ |
| 7 | $(.194X - 3.23) > Z > (.194X - 4.62)$ |
| 8 | $(.194X - 1.84) > Z > (.194X - 3.23)$ |
| 9 | $(.194X - .42) > Z > (.194X - 1.84)$ |
| 10 | $(.194X + 1) > Z > (.194X - .42)$ |
| 11 | $Z > (.194X + 1)$ |

Based on the foregoing inequalities, computer 60 is programmed to decide the current location of the receiver aircraft 13 and turn on the appropriate light modules. A programmable minicomputer 63 and associated multiplexer 61 (FIG. 6) are used for this purpose and a suitable choice is a Model 1603 Mini-Computer manufactured and sold by the ROLM Company of Cupertino, California. Once the computer 63 has performed the necessary computations as discussed more fully below, the results are outputted by multiplexer 61 (FIG. 6), which has three, 8-bit buffers loadable from computer 63, that feed the coded output signals to logic decoding circuitry 62. Circuitry 62 decodes the 24 bits and turns on the various light modules.

The commands to load the buffers are given by the first 8 bits of each word, while the second 8 bits represent the data, as follows:

| | | | | |
|---|---|---|---|---|
| 1100 | 1010 | EEEE | AAAA ; | Load AZ/EL |
| 1100 | 1011 | VVVP | PPPP ; | Load First 3 Bits of Velocity and Position |
| 1100 | 1100 | SVVV | VVVV ; | Load Sign and Last 7 Bits of Velocity |

The letter notation groups the data into five categories:

1. AZIMUTH (A)
2. ELEVATION (E)
3. FORE-AFT POSITION (P)
4. VELOCITY (V)
5. VELOCITY DIRECTION (S)

The azimuth and elevation codes each have four bits, giving each a range of 0 to 15.

The fore-aft position code (X) has five bits for a range of 0 to 31.

The velocity (X rate) has ten bits plus a sign ($\pm$) bit. The sign bit determines the direction of strobing with "one" corresponding to negative X RATE (receiver aircraft 13 is closing in) and strobing is from tail to nose of the tanker aircraft 12. "Zero" sign bit corresponds to positive X rate (receiver aircraft falling behind aircraft 12). The remaining ten bits determine the rate of strobing with all "ones" giving a 5 cycle/second rate, and all zeros causing strobe lights S1–S12 to be turned all on as described above.

One way to determine current zone location of the receiver aircraft is to program the computer to make multicomparisons until the correct inequality is satisfied. This involves storing all the constants and many calculations. A more efficient way of accomplishing this is to express the inequalities as a progression and solve for the desired zone. This is the technique used. This method involves only one equation for each series of inequalities. The following equations show the progressions used and how the codes are derived. The constants are derived by averaging the difference between the inequality constants.

(1) Major $X$ zone (a) $X > 16.73$, $X$ zone $= 6 + \frac{X - 1.73}{15}$, $X$ code $= 24 + \frac{X - 1.73}{15}$ (b) $X < 16.73$, have $X$ zones 1, 2, or 3 depending on $X$ and $Z$ (2) $X$ zone 2

(a) $X_n = -.58Z + (-7.07 + .74n)$ $0 \leq n \leq 19$

-continued $n = \frac{X + .58Z + 7.07}{.74}$, $X$ code $= 5 + n$ (b) $Z > .58X$ (bottom half)
$Z_n = (.58 + .0525n)X + 1.8n$ $n = \frac{Z - .58X}{.0525X + 1.8}$, $Z$ code $= 6 + n$ $Z < .58X$ (top half)
$Z_n = (.58 + .044n)X - 1.46n$ $n = \frac{.58X - Z}{.044X + 1.46}$, $Z$ code $= 6 - n$ (c) $Y_n = (.0618n)X + 2.13n$, $-5 \leq n \leq 5$ $n = \frac{Y}{.0618X + 2.13}$ $Y$ code $= 6 + \frac{Y}{.0618X + 2.13}$ (3) $Y$ cue zones in $X$ zones 3 through 9
$Y_n = 2.45n$, $-5 \leq n \leq +5$ $n = \frac{Y}{2.45}$ $Y$ code $= 6 + \frac{Y}{2.45}$ (4) $Z$ cue zones in $X$ zones 3, 4, and 5
$Z_n = 3.06 + 1.4n$ $n = \frac{Z - 3.06}{1.4}$, $-5 \leq n \leq 5$ $Z$ code $= 6 + \frac{Z - 3.06}{1.4}$ (5) $Z$ cue zones in $X$ zones 6 through 9
$Z_n = .194X - 6.01 + 1.4n$ $n = \frac{Z - .194X + 6.01}{1.4}$, $-5 \leq n \leq 5$ $Z$ code $= 6 + \frac{Z - .194X + 6.01}{1.4}$ The X rate code is determined by proper scaling of the X rate value. In the particular program used, the calculated X rate ($\dot{X}$) has one digit to the right of the decimal point (10X), and thus 8 feet/second is represented by a count of 80. Since we want this to correspond to the maximum velocity it must be scaled. This is accomplished by multiplying by 1.5 times the computed X rate to realize a maximum output code of approximately 127 for the maximum velocity of 8 ft/sec. (i.e., $1.5 \times 80 = 120$).

Description of Flow Chart

The foregoing equations for computing the zone location codes, and for computing the relative velocity code are implemented by programming minicomputer 63 according to the flow chart depicted in FIG. 10. Using standard notation, the oval blocks in FIG. 10 represent input data; the diamond shaped blocks represent decision functions, and the rectangular blocks designate computation functions. Thus, starting at the top of the flow chart, the digitally encoded data representing AZ, EL and R, developed by electro-optical sensor system 30 (FIG. 6) is entered at 250 and thereupon transformed at 252 into orthogonal cartesian coordinates X, Y and Z, using a standard computer program subroutine, such as used for transforming polar coordinates to cartesian coordinates. At the same time, the X rate ($\dot{X}$) is computed by taking the time derivative of X, again using standard computing procedures.

The resulting data is then fed to decision block 254, which may be a switch on the pilot's instrument panel for turning the guidance lights on or off. If the switch is in the off position, a NO decision results, which causes X code, Y code, Z code and XD code (representing $\dot{X}$ code) to be redefined as zero at computation block 256. As a result, the zero code is subsequently outputted by the computer to cause the various light modules of the display to be turned off.

If a YES decision is made at decision block 254, the X and Z coordinate values are redefined by computation block 255 to center the X,Y and Z coordinates at the center of the refueling envelope 22 as previously described, by subtracting 51.8 feet from the X value and subtracting 20 feet from the Z value. The resulting computations are fed to another decision block 258 which determines whether the receiver aircraft is forward or aft of 16.73 feet, corresponding to the aftmost boundary of major cue zone No. 3. A NO decision causes the data to be fed first to a decision block 260 which determines whether the X position is forward of major cue zone No. 2 (corresponding to envelope 22) by comparing the X value with the result of one of the equations derived above for determining the major cue zones in X. If the X position is forward of major cue zone No. 2, a YES results from block 260 which again causes the computations set forth in block 256. A NO decision causes the data to proceed to decision block 262 at which the computer uses one of the above derived equations to determine whether the X position is forward or aft of the aftmost boundary of major cue zone No. 2. If the X position is forward of such boundary, a NO decision results and the data is passed to computation block 264 for calculating the X and Y subzones within major cue zone No. 2. Similarly, the Z data is fed to a decision block 266 which determines whether the Z position is in the upper half or lower half of major cue zone No. 2 and depending upon the result channels the Z data to computation blocks 268 and 270 where the subzones in Z are computed.

If in decision block 262 it is determined that the X position lies aft of major cue zone No. 2, then a YES results and by the process of elimination it has thus been determined that the aircraft position is within major cue zone No. 3 and therefore, the X code is redefined as X code=24 in computation block 272, corresponding to major cue zone No. 3. This completes the computations for major cue zones Nos. 1–3.

If in decision block 258, X is greater than 16.73 and thus aft of major cue zone No. 2, YES results and the data is successively fed to computation block 274, decision block 276 and computation block 278 to compute the code outputs for major cues zones Nos. 4–9. Thus, when taken together with the output from computation block 272, the calculations for the major cue zones Nos. 3–9 are complete. Next, the data is fed to decision block 280 where the Y code for major cue zones Nos. 3–9 is computed using one of the above derived equations, and the result is fed on to decision block 282 which determines whether the X position is forward or aft of the boundary between major cue zones Nos. 5 and 6. If forward, a YES signal causes the Z code to be computed in decision block 284 for major cue zones Nos. 3–5, and if aft, a NO decision causes the Z code to be computed in block 286 for major cue zones Nos. 6–8. At this point, the X, Y and Z zone positions have been computed and are channeled together and fed to through a series of decision blocks 288, 292, 296 and 300 which determine whether the aircraft is positioned outside of the permissible elevation and azimuth cue zones represented by code Nos. 2–10. For example, in decision block 288, the Z code is checked to determine whether it is less than 1, and if YES, the Z code is redefined as 1, which as previously discussed, defines a position on the high side of the major cue zones. Similarly, decision block 292, together with computation block 294, compute the elevation code for an aircraft position that is below the major cue zones; decision block 296, together with computation block 298 compute the Y code for azimuthal positions to the left of the major cue zones; and decision block 300 together with computation block 302 compute the Y code for azimuthal positions to the right of the major cue zones.

Decision block 304 determines whether the X rate is in excess of code 80 representing 8 feet per second and if YES, the computation block 306 sets the X rate to 80, which after being multiplied by the factor of 1.5 in computation block 308 causes the output XDCOD to assume a maximum binary value for velocities equal to or in excess of 8 feet per second.

Decision blocks 310, 314 and 318, represent selector switches, which enable the outputting of code numbers for operating only certain portions of the display, such as the fore-aft or X display which is controlled by decision block 310 together with computation block 312; the AZ display which is controlled by decision block 314 together with computation block 316; and the EL display which is controlled by decision block 318 together with computation block 320.

The computed code numbers are grouped according to computation block 322 such that the Y and Z code numbers are grouped into a common word identified as YZ code. Also, block 322 outputs the X code, XDCOD and the YZ code to exit block 324. At block 324, the encoded data for the Y zone, Z zone and X zone, together with the $\dot{X}$ data is outputted to the decoding logic circuitry 62 (FIGS. 6-9).

Construction of Guidance-Light Modules

Figure 11:
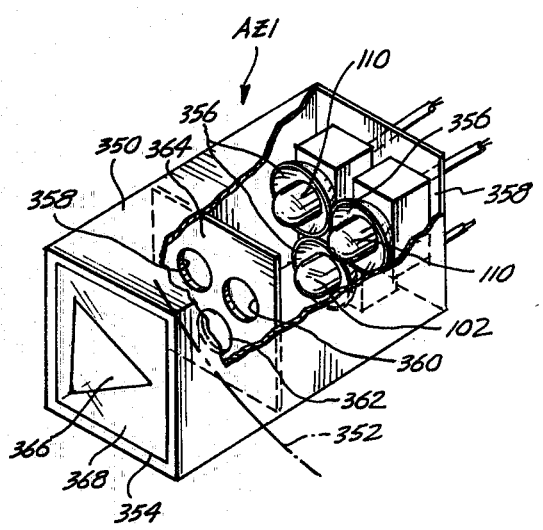
FIG. 11 is a detail view, in isometric, of one of the light modules used in the guidance-light display.
Figure 12:
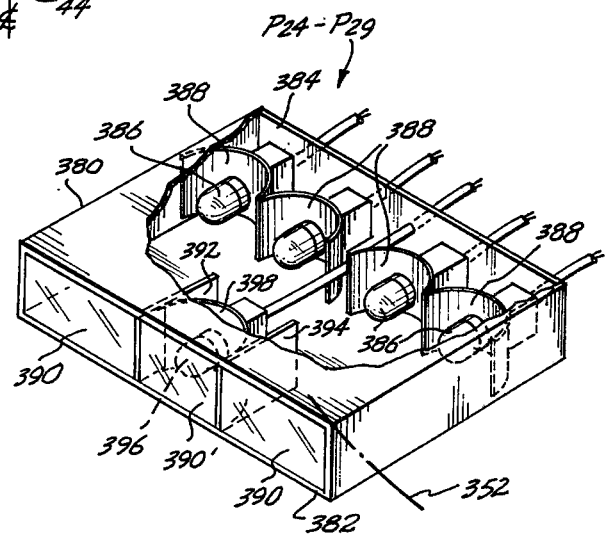
FIG. 12 is another detail view, also in isometric, illustrating another of the light modules used in the guidance-light display.

The modules of display 11 are of essentially similar construction and include the basic elements of one or more lamps, reflectors, color filters (where needed), a diffusing screen, and an aluminum housing. FIGS. 11 and 12, depicting the construction of one of the arrow-shaped light modules of elevation-azimuth array 40 (FIG. 11) and one of the bar-shaped aft position light modules (FIG. 12) illustrate the basic design used for all of the modules. Thus, with reference to FIG. 11, the AZ-left-outer module AZ1 is contained within an aluminum housing 350 of parallelepiped configuration mounted on aircraft 12 in a protruding, tilted relationship to the generally planar surface 352 of the belly of the aircraft with the display face 354 of the module facing generally aft and slightly downwardly. A set of three lamps including red lamp 102, amber lamps 110 and dim white lamp 116 are mounted at the center of parabolic reflectors 356 on a rear panel 358 of the module. Reflectors 356 focus the light from each of the lamps through individual ones of a set of three filters 358, 360 and 362 mounted in circular apertures provided in a partition 364 that is mounted intermediate panel 358 and the display face 354 of the module. Filter 362 is the red filter and directs the light from lamp 102 onto the rear surface of a diffusing screen 366 masked by an arrow-shaped shroud 368. Similarly, filter 360 is an amber filter which receives the light from lamp 110 and directs the amber colored illumination onto the rear of screen 366, while filter 358 is a neutral filter and directs light from lamp 116 onto screen 366 to form the dim white illumination.

In FIG. 12, the construction of modules P24–P29 is illustrated to include an aluminum housing 380, again of parallelepiped configuration, and mounted on aircraft 12 in a protruding, tilted relationship to the surface 352 of the aircraft's belly so that the display face 382 of the module is readily visible by the pilot of the receiver aircraft. At the back panel 384 of the module, a plurality of lamps 386 are arranged at the centers of a corresponding plurality of parabolic reflectors 388 for concentrating the light from lamps 386 on the rear surface of a front diffusing screen 390 that extends across the display face 382 of the module.

One of the rate indicating strobe lights S1–S12 is mounted at the front, center of module 380 and includes a pair of spaced apart light baffles 392 and 394 extending rearwardly from the display face 382 of the module and forming a shielded pocket within the module at the rear of which is mounted another light source including a lamp 396 and an associated parabolic reflector 398, for concentrating the light from lamp 396 on the center section 390' of the diffusing screen 390 bounded by baffles 392 and 394. As mentioned, the alternate dim white and bright white modes of modules P24–P29 may be provided by separate white lamps, which are alternately energized, or by a single set of lamps, as in the embodiment illustrated in FIG. 12, which are energized at two different selectable levels of intensity.

Operation

In summarizing the operation of the invention, it will be assumed that the receiver aircraft 13 is well behind the tanker aircraft 12 and is prepared to approach the refueling envelope 22. First, the pilot of aircraft 13 drops below the elevation of tanker aircraft 12 so that to observe display 11 (FIG. 1) the pilot looks forwardly and slightly upwardly past the nozzle end of boom 16. At this time, it is assumed that retroreflector 34 on receiver aircraft 13 is still aft of the rearmost major cue zone, i.e., zone No. 8 (FIG. 5). Accordingly, fore-aft array 42 of display 11 is in a condition in which the set of aft position indicating modules 48 are all dim white, center square indicator 52 within the set of envelope position modules 46 is also dim white, as is the forwardmost envelope position module P5. The dim white illumination of the foregoing modules provides the pilot with a reference background, which is of great assistance in attempting to approach the lead aircraft during darkness. Also at this time, the strobe lights S1–S12 have begun to strobe toward the nose of the lead aircraft 12, at a rate indicating the relative velocity between the two aircraft.

The receiver aircraft 13 now closes on the tanker aircraft 12 and moves into major cue zone No. 8 (X29) causing the aft position light module P29 to become bright white. The remaining modules of the fore-aft array 42 remain the same as above. The elevation-azimuth array 40, which in the meantime has become active soon as the receiver aircraft enters the range of sensor 30, assumes the illumination modes which as described above indicate to the pilot whether he is within the proper approach tunnel, and whether elevational or azimuthal corrections are needed. Strobe lights S1–S12 continue to strobe forward, and the rate of such strobing may indicate to the receiver aircraft pilot that he is closing too fast and must back off on the throttle.

While remaining within the elevational and azimuthal boundaries of the major cue zones, the receiver aircraft advances through zones 7, 6, 5, 4 and 3, causing the aft position light modules P28–P24 to become bright white in that sequence.

Upon reaching major cue zone No. 3 (X24) the aforewardmost module P24 of the aft position light modules 48, is illuminated bright white and responsively the pilot assesses his fore-aft rate by observing the strobing frequency of lights S1–S12 and slowly enters major cue zone #2 and thus the refueling envelope 22. Upon doing so, all the aft position light modules P24–P29 are dim white, and the set of envelope position modules 46 are activated. Center square indicator 52 switches from dim white to green, and the fore-aft position is instantaneously displayed by the appropriate one of modules P6–P23 being illuminated green. An effort now is made to move to the fore-aft center of the refueling envelope which will be displayed by a moving green bar as the various light modules P23–P14 turn green, in succession, forming the illusion of a green bar moving along the display panel. In actual practice, it is extremely difficult for the pilot in the trailing aircraft to maintain an exact fore-aft center position and thus the moving green bar tends to vascillate fore and aft in the vicinity of center square indicator 52. Perfect position is represented by the moving green bar being located crosswise at the center of indicator 52 or, in other words, module P14 being illuminated green.

Concurrently with the fore-aft manuevering, the elevation-azimuth array 40 displays position and command information to assist the pilot in making corrections up or down, and right or left. For example, assume that the pilot has successfully entered the refueling envelope 22 and is holding the green bar of panel 46 approximately at the center square indicator 52. However, he sees that the AZ-left-outer module AZ1 is flashing red. As described above, this indicates that the trailing aircraft is about to pass out of the refueling envelope on the lefthand side and that a correction to the right is immediately needed. As the aircraft moves to the right, AZ1 first changes to a blinking amber color and thereafter to dim white, while module AZ2 switches from dim white to green indicating that the correction has been effective and the aircraft is moving toward the azimuthal center of the envelope. Further correction to the right causes AZ2 to switch to dim white and the lefthand quadrant of indicator 50, namely, module AZ3 to switch from dim white to green. Finally, as perfect centering is achieved, the righthand quadrant of indicator 50, namely AZ4 also switches from dim white to green so that the two opposing quadrants in the azimuthal plane are illuminated green to indicate a perfect azimuthal position.

At the same time that flight corrections to the left or right are being made, the up and down position as indicated by light modules EL1–EL6 is being monitored by the pilot and appropriate elevational corrections are made. When the pilot has positioned his aircraft perfectly, in both azimuth and elevation, all four quadrants of indicator 50 become green.

During nighttime, the various illumination modes of display 11, including the dim white background modes, enable the pilot of the receiver aircraft 13 to be guided smoothly and precisely into refueling position, even when he is unable to see the profile of the tanker aircraft, and must rely solely on the position indicating and command functions of the display. These same display functions are also very effective in enabling the pilot of the receiver aircraft to make rapid and precise corrections when the two aircraft are flying through turbulent air and there is constant and abrupt shifting of the relative aircraft positions. In the presence of turbulent air, and other adverse environmental conditions, display 11 has significantly improved the ability of the pilot in the receiver aircraft to stay within the refueling envelope.

While only a particular embodiment of the invention has been disclosed herein, it will be readily apparent to persons skilled in the art that numerous changes and modifications can be made thereto without departing from the spirit of the invention. For example, any of various types of known position sensors can be used for operating display 11, including not only other forms of electro-optical sensors but also microwave sensing systems.

The embodiments of the invention in which an exclusive property or privilege is claimed are defined as follows:

1. A guidance-light display apparatus for mounting on a lead aircraft so as to be visible by a pilot of a trailing aircraft for guiding such pilot in flying the trailing aircraft into a predetermined in-flight link-up position with respect to the lead aircraft, comprising:
  sensor means for producing an electrical signal representing the instantaneous position of the trailing aircraft relative to the lead aircraft and associated means responsive to said sensor means for producing an electrical signal representing the relative velocity between the lead and trailing aircraft along a fore-aft axis that is parallel to the longitudinal axis of the lead aircraft;
  an array of spaced apart guidance lights arranged on the body of the lead aircraft along a line extending parallel to said longitudinal axis;
  light operating means responsive to said associated means for sequentially strobing said lights lengthwise of said array at a strobing frequency that varies as a function of said signal representing said relative velocity.

2. The guidance-light display apparatus of claim 1, furth comprising:
  means responsive to said associated means for producing an electrical signal representing the direction of said relative velocity between said aircraft; and
  means for changing the direction along said array at which said lights are sequentially strobed in response to said signal representing the direction of said relative velocity.

3. A guidance-light display apparatus suitable for being mounted on a lead aircraft for guiding the pilot of a trailing aircraft into said predetermined target position for in-flight link-up of the lead and trailing aircraft, comprising:
  position sensor means mounted on the lead aircraft for producing electrical signals representing the instantaneous position of the trailing aircraft with respect to the lead aircraft;
  an array of electrically controllable guidance lights disposed on the body of the lead aircraft in a position visible by the pilot of the trailing aircraft as the latter approaches the former for link-up;
  electrical computer means for receiving said electrical signals representing said instantaneous position and for comparing said electrical signals with stored data representing a predetermined plurality of imaginary three-dimensional cue zones in the free space surrounding said predetermined target position, said computer means producing encoded electrical signals representing the position of the trailing aircraft with respect to said plurality of said cue zones; and
  electrical decoding means responsive to said encoded electrical signals reproduced by said computer means for operating said guidance lights in response to the movement of said trailing aircraft through said plurality of cue zones.

4. The guidance-light display apparatus of claim 3, wherein said stored data in said computer means represents imaginary cue zones that are oriented along each of a set of three orthogonal axes, including a fore-aft axis, an elevation axis, and an azimuth axis, and wherein said array of lights comprises a fore-aft array of lights arranged in a line extending lengthwise of the fuselage of the lead aircraft, and an elevation-azimuth array of lights including two lines of lights, one of which extends lengthwise of the fuselage of said lead aircraft in spaced parallel relation to said fore-aft array of lights and represents relative position along said elevation axis, and the other line of lights of said elevation-azimuth array extends crosswise of the fuselage of said lead aircraft and intersects with the first mentioned line of lights of said elevation-azimuth array and represents relative position along said azimuth axis; and
  wherein said computer means includes means for receiving electrical signals from said position sensing means and for selectively controlling the illumination of said lights in said fore-aft array and in said elevation-azimuth array as a function of the instantaneous position of the trailing aircraft relative to the imaginary cue zones represented by said stored data.

5. The guidance-light display apparatus of claim 4 further comprising a plurality of rate indicating strobe lights arranged in a line proximate and parallel to said fore-aft array of lights;
  said computer means having means for deriving an electrical signal representing the relative velocity between said lead and trailing aircraft along said fore-aft axis from said electrical signals representing said instantaneous position; and
  circuit means for sequentially strobing said plurality of strobe lights lengthwise of said fore-aft array at a strobing frequency that varies as a function of said signal representing said relative velocity along said fore-aft axis.

6. The guidance-light display apparatus of claim 5, said computer means further comprising means for deriving an electrical signal representing the direction of said relative velocity between said aircraft along said fore-aft axis from said electrical signals representing said instantaneous position; and
  said circuit means further including means responsive to said signal representing the direction of aid relative velocity for changing the direction of sequential strobing of said strobe lights as a function of said signal representing the direction of said relative velocity.

7. The guidance-light display apparatus of claim 4, wherein said elevation-azimuth array comprises a center position indicator that has a generally square-shaped display face in which such display face is segmented into four individually illuminatable, triangular shaped quadrants in which a first pair of opposing quadrants are aligned with the first mentioned line of lights in said elevation-azimuth array, and the remaining pair of opposing quadrants are aligned with the other line of lights of said elevation-azimuth array; and further comprising circuit means responsive to said computer means for causing said first pair of quadrants of said center position indicator of said elevation-azimuth array to be illuminated with a predetermined color code when the trailing aircraft has attained on target elevation positioning for said predetermined target position, and for causing said second pair of quadrants of said indicator to be illuminated with a predetermined color code when the trailing aircraft has attained on target azimuthal positioning for said predetermined target position.

8. The guidance-light display of claim 7, wherein said elevation-azimuth array of lights is further defined by each of said lights of said two lines of lights being arrow-shaped, in which all of the arrow-shaped lights are arranged with the apexes pointing to the center of said elevation-azimuth array.

9. The guidance-light display apparatus of claim 4, wherein said fore-aft array of lights comprises a center position light, arranged along said line of lights in said fore-aft array so as to provide a reference that represents said predetermined target position along said fore-aft axis, and further comprising circuit means responsive to said computer means for selectively controlling the illumination of said lights of said fore-aft array so as to visually indicate the fore-aft position of the trailing aircraft with respect to the target position represented by said center position indicator.

10. The guidance-light display apparatus of claim 5, further comprising slow rate detection means responsive to said signal representing said relative velocity for detecting a predetermined minimum relative velocity, in either direction; and said circuit means further including means responsive to said slow rate detection means for causing said strobe lights to assume a steady illumination mode when said predetermined minimum velocity has been detected so as to visually indicate that the trailing aircraft has attained a relative fore-aft velocity approximately matching that of the lead aircraft.

11. The guidance-light display apparatus of claim 1 further comprising slow velocity detection means responsive to said signal representing the relative velocity between the aircraft for detecting a predetermined, minimum, relative velocity; and light operating means responsive to said slow velocity detection means for causing said array of guidance-lights to assume a steady illumination mode so as to indicate that the trailing aircraft has attained a fore-aft velocity approximately matching that of the lead aircraft.

* * * * *